United States Patent
Duffield et al.

(10) Patent No.: US 10,678,860 B1
(45) Date of Patent: Jun. 9, 2020

(54) AUTOMATIC GENERATION OF COMPOSITE DATASETS BASED ON HIERARCHICAL FIELDS

(71) Applicant: Palantir Technologies, Inc., Palo Alto, CA (US)

(72) Inventors: Ben Duffield, London (GB); Patrick Woody, Bryn Mawr, PA (US); Rahul Mehta, New York, NY (US)

(73) Assignee: PALANTIR TECHNOLOGIES, INC., Palo Alto, CA (US)

( * ) Notice: Subject to any disclaimer, the term of this patent is extended or adjusted under 35 U.S.C. 154(b) by 721 days.

(21) Appl. No.: 15/282,780

(22) Filed: Sep. 30, 2016

Related U.S. Application Data

(63) Continuation of application No. 14/996,179, filed on Jan. 14, 2016, now Pat. No. 9,542,446.
(Continued)

(51) Int. Cl.
   *G06F 16/9032* (2019.01)
   *G06F 16/248* (2019.01)
   (Continued)

(52) U.S. Cl.
   CPC ...... *G06F 16/90332* (2019.01); *G06F 16/248* (2019.01); *G06F 16/2456* (2019.01);
   (Continued)

(58) Field of Classification Search
   CPC ......... G06F 16/90332; G06F 16/90324; G06F 16/24578; G06F 16/285; G06F 16/248; G06F 16/2456
   (Continued)

(56) References Cited

U.S. PATENT DOCUMENTS 4,881,179 A  11/1989  Vincent
5,109,399 A  4/1992  Thompson
(Continued)

FOREIGN PATENT DOCUMENTS

AU  2013251186  11/2015
AU  2014206155  12/2015
(Continued)

OTHER PUBLICATIONS

Abbey, Kristen, "Review of Google Docs," May 1, 2007, pp. 2.
(Continued)

*Primary Examiner* — Shahid A Alam
(74) *Attorney, Agent, or Firm* — Hickman Palermo Becker Bingham LLP

(57) ABSTRACT

Datasets are annotated with metadata including categories. Each category corresponds to one or more fields. A hierarchy mapping is generated to indicate a hierarchical relationship between different categories. A natural language query specifies a first granularity level indicating a particular category and one or more field values corresponding to the particular category. Based on the hierarchy mapping, one or more categories that are hierarchically related to the particular category are identified. Based on the metadata, two or more datasets that include at least one hierarchically related category is selected. Based on the first granularity level, one or more dataset filters are generated. The one or more dataset filters are translated to a second granularity level corresponding to the at least one hierarchically related category. The translated filters are applied to at least one of the selected datasets. The two or more datasets are joined to generate a composite dataset.

20 Claims, 14 Drawing Sheets

Related U.S. Application Data

(60) Provisional application No. 62/268,743, filed on Dec. 17, 2015.

(51) Int. Cl.
    *G06F 16/28*         (2019.01)
    *G06F 16/2455*     (2019.01)
    *G06F 16/2457*     (2019.01)

(52) U.S. Cl.
    CPC ...... *G06F 16/24578* (2019.01); *G06F 16/285* (2019.01); *G06F 16/90324* (2019.01)

(58) Field of Classification Search
    USPC .......................................................... 707/723
    See application file for complete search history.

(56) References Cited

U.S. PATENT DOCUMENTS

| | | |
|---|---|---|
| 5,241,625 A | 8/1993 | Epard et al. |
| 5,329,108 A | 7/1994 | Lamoure |
| 5,623,659 A | 4/1997 | Shi et al. |
| 5,632,009 A | 5/1997 | Rao et al. |
| 5,670,987 A | 9/1997 | Doi et al. |
| 5,724,575 A | 3/1998 | Hoover et al. |
| 5,781,704 A | 7/1998 | Rossmo |
| 5,798,769 A | 8/1998 | Chiu et al. |
| 5,845,300 A | 12/1998 | Comer |
| 5,872,973 A | 2/1999 | Mitchell et al. |
| 5,897,636 A | 4/1999 | Kaeser |
| 5,999,911 A | 12/1999 | Berg et al. |
| 6,057,757 A | 5/2000 | Arrowsmith et al. |
| 6,065,026 A | 5/2000 | Cornelia et al. |
| 6,073,129 A | 6/2000 | Levine et al. |
| 6,091,956 A | 7/2000 | Hollenberg |
| 6,094,653 A | 7/2000 | Li et al. |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,418,438 B1 | 7/2002 | Campbell |
| 6,430,305 B1 | 8/2002 | Decker |
| 6,456,997 B1 | 9/2002 | Shukla |
| 6,510,504 B2 | 1/2003 | Satyanarayana |
| 6,523,019 B1 | 2/2003 | Borthwick |
| 6,549,752 B2 | 4/2003 | Tsukamoto |
| 6,549,944 B1 | 4/2003 | Weinberg et al. |
| 6,560,620 B1 | 5/2003 | Ching |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,674,434 B1 | 1/2004 | Chojnacki et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,086,028 B1 | 8/2006 | Davis et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,440,978 B2 | 10/2008 | Chan et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,455 B1 | 12/2009 | Keene et al. |
| 7,634,717 B2 | 12/2009 | Chamberlain et al. |
| 7,702,616 B1 | 4/2010 | Li et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,765,489 B1 | 7/2010 | Shah |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,814,085 B1 | 10/2010 | Pfleger et al. |
| 7,818,658 B2 | 10/2010 | Chen |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,958,147 B1 | 6/2011 | Turner et al. |

(56) References Cited

U.S. PATENT DOCUMENTS

| | | |
|---|---|---|
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,041,714 B2 | 10/2011 | Aymeloglu et al. |
| 8,073,857 B2 | 12/2011 | Sreekanth |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,331 B2 | 1/2015 | McGrew et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,954,410 B2 | 2/2015 | Chang et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,092,482 B2 | 7/2015 | Harris et al. |
| 9,116,975 B2 | 8/2015 | Shankar et al. |
| 9,165,100 B2 | 10/2015 | Begur et al. |
| 9,208,159 B2 | 12/2015 | Stowe et al. |
| 9,230,280 B1 | 1/2016 | Maag et al. |
| 9,280,532 B2 | 3/2016 | Cicerone |
| 9,286,373 B2 | 3/2016 | Elliot et al. |
| 9,348,880 B1 | 5/2016 | Kramer et al. |
| 9,383,911 B2 | 7/2016 | Aymeloglu et al. |
| 9,542,446 B1 | 1/2017 | Duffield et al. |
| 9,576,003 B2 | 2/2017 | McGrew et al. |
| 9,639,578 B2 | 5/2017 | Stowe et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091694 A1 | 7/2002 | Senay et al. |
| 2002/0091707 A1 | 7/2002 | Hrle et al. |
| 2002/0095360 A1 | 7/2002 | Keller |
| 2002/0095416 A1 | 7/2002 | Joao |
| 2002/0095658 A1 | 7/2002 | Schwols |
| 2002/0103705 A1 | 8/2002 | Shulman |
| 2002/0116120 A1 | 8/2002 | Brady |
| 2002/0174201 A1 | 11/2002 | Ruiz et al. |
| 2002/0188638 A1 | 12/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0093755 A1 | 5/2003 | O'Carroll |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0196108 A1 | 10/2003 | Kung |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |

(56) References Cited

U.S. PATENT DOCUMENTS

| | | |
|---|---|---|
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0163039 A1 | 8/2004 | Gorman |
| 2004/0193600 A1 | 9/2004 | Kaasten et al. |
| 2004/0205492 A1 | 10/2004 | Newsome |
| 2004/0215649 A1 | 10/2004 | Whalen et al. |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0097441 A1 | 5/2005 | Herbach et al. |
| 2005/0097482 A1 | 5/2005 | Hanson et al. |
| 2005/0108231 A1 | 5/2005 | Findleton et al. |
| 2005/0114763 A1 | 5/2005 | Nonomura et al. |
| 2005/0125715 A1 | 6/2005 | Di Franco et al. |
| 2005/0131964 A1 | 6/2005 | Saxena |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0062426 A1 | 3/2006 | Levy et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080316 A1 | 4/2006 | Gilmore et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0161558 A1 | 7/2006 | Tamma et al. |
| 2006/0178915 A1 | 8/2006 | Chao |
| 2006/0203337 A1 | 9/2006 | White |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0248084 A1 | 11/2006 | Sack et al. |
| 2006/0253502 A1 | 11/2006 | Raman et al. |
| 2006/0265397 A1 | 11/2006 | Bryan et al. |
| 2006/0265417 A1 | 11/2006 | Amato et al. |
| 2006/0265758 A1 | 11/2006 | Khandelwal et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2006/0288056 A1 | 12/2006 | Yamakawa et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0143253 A1 | 6/2007 | Kostamaa et al. |
| 2007/0150369 A1 | 6/2007 | Zivin |
| 2007/0168292 A1 | 7/2007 | Jogand-Coulomb et al. |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0233756 A1 | 10/2007 | D'Souza et al. |
| 2007/0240062 A1 | 10/2007 | Christena et al. |
| 2007/0245339 A1 | 10/2007 | Bauman et al. |
| 2007/0260648 A1 | 11/2007 | Friesenhahn et al. |
| 2007/0266336 A1 | 11/2007 | Nojima et al. |
| 2007/0271212 A1 | 11/2007 | Jones et al. |
| 2007/0271317 A1 | 11/2007 | Carmel |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0015970 A1 | 1/2008 | Brookfield et al. |
| 2008/0016155 A1 | 1/2008 | Khalatian |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0104060 A1 | 5/2008 | Abhyankar et al. |
| 2008/0104141 A1 | 5/2008 | McMahon |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0249820 A1 | 10/2008 | Pathria |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |

(56) References Cited

U.S. PATENT DOCUMENTS

| | | |
|---|---|---|
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301378 A1 | 12/2008 | Carrie |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0031401 A1 | 1/2009 | Cudich et al. |
| 2009/0037417 A1 | 2/2009 | Shankar et al. |
| 2009/0043801 A1 | 2/2009 | LeClair |
| 2009/0055251 A1 | 2/2009 | Shah et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271435 A1 | 10/2009 | Yako et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313223 A1 | 12/2009 | Rantanen |
| 2009/0313311 A1 | 12/2009 | Hoffmann et al. |
| 2009/0313463 A1 | 12/2009 | Pang et al. |
| 2009/0319891 A1 | 12/2009 | MacKinlay |
| 2010/0011282 A1 | 1/2010 | Dollard et al. |
| 2010/0036831 A1 | 2/2010 | Vemuri et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0076939 A1 | 3/2010 | Iwaki et al. |
| 2010/0082541 A1 | 4/2010 | Kottomtharayil |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0162176 A1 | 6/2010 | Dunton |
| 2010/0173619 A1 | 7/2010 | Hua et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0223260 A1 | 9/2010 | Wu |
| 2010/0228812 A1 | 9/2010 | Uomini |
| 2010/0235606 A1 | 9/2010 | Oreland et al. |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0106795 A1 | 5/2011 | Maim |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0179048 A1 | 7/2011 | Satlow |
| 2011/0184813 A1 | 7/2011 | Barne et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |

(56) References Cited

U.S. PATENT DOCUMENTS

| | | |
|---|---|---|
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0258242 A1 | 10/2011 | Eidson et al. |
| 2011/0270705 A1 | 11/2011 | Parker |
| 2011/0270812 A1 | 11/2011 | Ruby |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0136804 A1 | 5/2012 | Lucia |
| 2012/0137235 A1 | 5/2012 | Ts et al. |
| 2012/0144335 A1 | 6/2012 | Abeln et al. |
| 2012/0150791 A1 | 6/2012 | Willson |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0089339 A1 | 3/2014 | Siddiqui et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards et al. |
| 2014/0149272 A1 | 5/2014 | Hirani et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming et al. |

(56) References Cited

U.S. PATENT DOCUMENTS

| | | |
|---|---|---|
| 2014/0214579 A1 | 7/2014 | Shen et al. |
| 2014/0222521 A1 | 7/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0039886 A1 | 2/2015 | Kahol et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0254220 A1 | 9/2015 | Burr et al. |
| 2015/0261817 A1 | 9/2015 | Harris et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0341467 A1 | 11/2015 | Lim et al. |
| 2016/0034545 A1 | 2/2016 | Shankar et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0147730 A1 | 5/2016 | Cicerone |
| 2016/0162519 A1 | 6/2016 | Stowe et al. |
| 2017/0169244 A1 | 6/2017 | McGrew et al. |

FOREIGN PATENT DOCUMENTS

| | | |
|---|---|---|
| CN | 102054015 | 5/2014 |
| DE | 102014103482 | 9/2014 |
| DE | 102014215621 | 2/2015 |
| EP | 0652513 | 5/1995 |
| EP | 1672527 | 6/2006 |
| EP | 2551799 | 1/2013 |
| EP | 2555126 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 01/025906 | 4/2001 |
| WO | WO 2001/088750 | 11/2001 |
| WO | WO 2002/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/025915 | 3/2012 |
| WO | WO 2012/119008 | 9/2012 |
| WO | WO 2013/010157 | 1/2013 |
| WO | WO 2013/102892 | 7/2013 |
| WO | WO 2013/115985 A2 | 8/2013 |

OTHER PUBLICATIONS

Official Communication for European Patent Application No. 14180321.3 dated Apr. 17, 2015.
Official Communication for European Patent Application No. 15190307.7 dated Feb. 19, 2016.
Official Communication for European Patent Application No. 15188106.7 dated Feb. 3, 2016.
Official Communication for European Patent Application No. 14187996.5 dated Feb. 12, 2015.
Official Communication for New Zealand Patent Application No. 628263 dated Aug. 12, 2014.
Official Communication for European Patent Application No. 15155846.7 dated Jul. 8, 2015.
"GrabUp—What a Timesaver!" <http://atichris.com/191/grabup/>, Aug. 11, 2008, pp. 3.
Microsoft, "Registering an Application to a URI Scheme," <http://msdn.microsoft.com/en-us/library/aa767914.aspx>, printed Apr. 4, 2009 in 4 pages.
Palmas et al., "An Edge-Bunding Layout for Interactive Parallel Coordinates" 2014 IEEE Pacific Visualization Symposium, pp. 57-64.
Kwout, <http://web.archive.org/web/20080905132448/http://www.kwout.com/> Sep. 5, 2008, pp. 2.
Official Communication for New Zealand Patent Application No. 622473 dated Jun. 19, 2014.
Manske, "File Saving Dialogs," <http://www.mozilla.org/editor/ui_specs/FileSaveDialogs.html>, Jan. 20, 1999, pp. 7.
Online Tech Tips, "Clip2Net—Share files, folders and screenshots easily," <http://www.online-tech-tips.com/free-software-downloads/share-files-folders-screenshots/>, Apr. 2, 2008, pp. 5.
Official Communication for Australian Patent Application No. 2014210604 dated Jun. 5, 2015.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Yang et al., "HTML Page Analysis Based on Visual Cues", A129, pp. 859-864, 2001.

(56) References Cited

OTHER PUBLICATIONS

European Claims in application No. 08730336.8-1951, dated Oct. 2016, 8 pages.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Li et al., "Interactive Multimodal Visual Search on Mobile Device," IEEE Transactions on Multimedia, vol. 15, No. 3, Apr. 1, 2013, pp. 594-607.
Gesher, Ari, "Palantir Screenshots in the Wild: Swing Sightings," The Palantir Blog, 11 Sep. 2007, pp. 1-12, retrieved from the internet https://www.palantir.com/2007/09/palantir-screenshots/ retrieved on Aug. 18, 2015.
"Hbase-Hbase Home," downloaded from the internet on Sep. 14, 2011, http://hbase.appache.org, 1 page.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Official Communication for European Patent Application No. 14187739.9 dated Jul. 6, 2015.
Map of San Jose, CA. Retrieved Oct. 2, 2013 from http://maps.bing.com.
Niepert et al., "A Dynamic Ontology for a Dynamic Reference Work", Joint Conference on Digital Libraries, Jun. 17_22, 2007, Vancouver, British Columbia, Canada, pp. 1-10.
Microsoft, "How Word Creates and Recovers the AutoRecover files," <http://support.microsoft.com/kb/107686>, Article ID: 107686, printed Feb. 11, 2010 in 3 pages.
Griffith, Daniel A., "A Generalized Huff Model," Geographical Analysis, Apr. 1982, vol. 14, No. 2, pp. 135-144.
Official Communication for Australian Patent Application No. 2014213553 dated May 7, 2015.
Official Communication for European Patent Application No. 09813695.5 dated Apr. 9, 2014.
Official Communication in New Zealand Application No. 628840 dated Aug. 28, 2014.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Official Communication for European Patent Application No. 09813693.0 dated Apr. 8, 2014.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Huang et al., "Systematic and Integrative Analysis of Large Gene Lists Using DAVID Bioinformatics Resources," Nature Protocols, 4.1, 2008, 44-57.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Official Communication for Canadian Patent Application No. 2,677,464 dated Jan. 16, 2013.
Official Communication for Australian Patent Application No. 2014202442 dated Mar. 19, 2015.
Official Communication for European Patent Application No. 14189802.3 dated May 11, 2015.
Ask Drexel University Knowledge Base, "How to: Auto Save a Document Before Printing in Word 2007," published Nov. 13, 2007.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Official Communication for Australian Patent Application No. 2012203606 dated Jan. 22, 2014.
Definition "Overlay", downloaded Jan. 22, 2015, 1 page.
Schroder, Stan, "15 Ways to Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Manno et al., "Introducing Collaboration in Single-user Applications through the Centralized Control Architecture," 2010, pp. 10.
Kokossi et al., "D7-Dynamic Ontology Management System (Design)", Information Societies Technology Programme, pp. 1-27.
Official Communication for European Patent Application No. 14197895.7 dated Apr. 28, 2015.
Wang et al., "Research on a Clustering Data De-Duplication Mechanism Based on Bloom Filter," IEEE 2010, 5 pages.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Claims for Australian Patent Application No. 2012203606 dated Jan. 2014.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Galliford, Miles, "SnagIt Versus Free Screen Capture Software: Critical Tools for Website Owners," <http://www.subhub.com/articles/free-screen-capture-software>, Mar. 27, 2008, pp. 11.
Official Communication for New Zealand Patent Application No. 622517 dated Apr. 3, 2014.
Antoshenkov, Gennady, "Dictionary-Based Order-Preserving String Compression", The VLDB Journal, pp. 26-39, 1997.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Ferreira et al., "A Scheme for Analyzing Electronic Payment Systems," Basil 1997.
Keylines.com, "KeyLines Datasheet," Mar. 2014, <http://keylines.com/wp-content/uploads/2014/03/KeyLines-datasheet.pdf> downloaded May 12, 2014 in 2 pages.
Official Communication for Canadian Patent Application No. 2831660 dated Jun. 9, 2015.
Official Communication for New Zealand Patent Application No. 628495 dated Aug. 19, 2014.
Umagandhi et al., "Search Query Recommendations Using Hybrid User Profile with Query Logs," International Journal of Computer Applications, vol. 80, No. 10, Oct. 1, 2013, pp. 7-18.
Official Communication for New Zealand Patent Application No. 622513 dated Apr. 3, 2014.
Official Communication for Great Britain Patent Application No. 1404499.4 dated Aug. 20, 2014.
"Using Whois Based Geolocation and Google Maps API for Support Cybercrime Investigations," http://wseas.us/e-library/conferences/2013/Dubrovnik/TELECIRC/TELECIRC-32.pdf.
Canese et al., "Chapter 2: PubMed: The Bibliographic Database," The NCBI Handbook, Oct. 2002, pp. 1-10.
Thompson, Mick, "Getting Started with GEO," Getting Started with GEO, Jul. 26, 2011.
Official Communication for European Patent Application No. 14180432.8 dated Jun. 23, 2015.
Microsoft, "Introduction to Versioning," <http://office.microsoft.com/en-us/sharepointtechnolgy/HA010021576.aspx?mode=print>, 2007 in 3 pages.
Official Communication for Great Britain Patent Application No. 1408025.3 dated Nov. 6, 2014.

(56) References Cited

OTHER PUBLICATIONS

Hibbert et al., "Prediction of Shopping Behavior Using a Huff Model Within a GIS Framework," Healthy Eating in Context, Mar. 18, 2011, pp. 16.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Symantec Corporation, "E-Security Begins with Sound Security Policies," Announcement Symantec, Jun. 14, 2001.
Warren, Christina, "TUAW Faceoff: Screenshot apps on the firing line," <http://www.tuaw.com/2008/05/05/tuaw-faceoff-screenshot-apps-on-the-firing-lineh, May 5, 2008, pp. 11.
Official Communication for New Zealand Patent Application No. 622473 dated Mar. 27, 2014.
Official Communication for Australian Patent Application No. 2013251186 dated Mar. 12, 2015.
"A First Look: Predicting Market Demand for Food Retail using a Huff Analysis," TRF Policy Solutions, Jul. 2012, pp. 30.
Notice of Acceptance for Australian Patent Application No. 2013251186 dated Nov. 6, 2015.
Microsoft, "Using the Clipboard," <http://msdn.microsoft.com/en-us/library/ms649016.aspx>, printed Jun. 8, 2009 in 20 pages.
Devanbu et al., "Authentic Third-party Data Publication", http://www.cs.ucdavis.edu/~devanbu/authdbpub.pdf, p. 19, 2000.
Azad, Khalid, "A Visual Guide to Version Control," <http://betterexplained.com/articles/a-visual-guide-to-version-control/>, Sep. 27, 2007 in 11 pages.
Official Communication for Great Britain Patent Application No. 1404457.2 dated Aug. 14, 2014.
Hansen et al., "Analyzing Social Media Networks with NodeXL: Insights from a Connected World", Chapter 4, pp. 53-67 and Chapter 10, pp. 143-164, published Sep.
Official Communication for Netherlands Patent Application No. 2012438 dated Sep. 21, 2015.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Hogue et al., "Thresher: Automating the Unwrapping of Semantic Content from the World Wide Web", 14th International Conference on World Wide Web, WWW 2005: Chiba, Japan, May 10-14, 2005.
Official Communication for Netherlands Patent Application No. 2012436 dated Nov. 6, 2015.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Definition "Identify", downloaded Jan. 22, 2015, 1 page.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Official Communication for European Patent Application No. 14180142.3 dated Feb. 6, 2015.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Official Communication for European Patent Application No. 14199182.8 dated Mar. 13, 2015.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Official Communication for European Patent Application No. 14197879.1 dated Apr. 28, 2015.
European Patent Office, "Search Report" in application on. 16204594.2-1507, dated May 18, 2017, 8 pages.
European Claims in application No. 16204594.2-1507 dated May 2017, 6 pages.
Claims for European Patent Application No. 12173312.5 dated Jun. 2012.
Anonymous, "BackTult—JD Edwards One World Version Control System", in 1 page, Jul. 23, 2007.
Official Communication for Canadian Patent Application No. 2,677,464 dated Mar. 19, 2012.
Hua et al., "A Multi-attribute Data Structure with Parallel Bloom Filters for Network Services", HiPC 2006, LNCS 4297, pp. 277-288, 2006.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Official Communication for European Patent Application No. 14158861.6 dated Jun. 16, 2014.
Alur et al., "Chapter 2: IBM InfoSphere DataStage Stages," IBM InfoSphere DataStage Data Flow and Job Design, Jul. 1, 2008, pp. 35-137.
Official Communication for European Patent Application No. 12181585.6 dated Sep. 4, 2015.
Official Communication for Australian Patent Application No. 2014210614 dated Jun. 5, 2015.
Official Communication for Netherlands Patent Application No. 2013306 dated Apr. 24, 2015.
Official Communication for European Patent Application No. 14159464.8 dated Jul. 31, 2014.
Nolan et al., "MCARTA: A Malicious Code Automated Run-Time Analysis Framework," Homeland Security, 2012 IEEE Conference on Technologies for, Nov. 13, 2012, pages.
Rouse, Margaret, "OLAP Cube," <http://searchdatamanagement.techtarget.com/definition/OLAP-cube>, Apr. 28, 2012.
Goswami, Gautam, "Quite Writly Said!," One Brick at a Time, Aug. 21, 2005, pp. 7.
Elmasri et al., "Fundamentals of Database Systems", Fourth Edition, pp. 455-491, 2004.
Official Communication for European Patent Application No. 14159464.8 dated Aug. 20, 2014.
Palantir Technologies, "Palantir Labs—Timeline," Oct. 1, 2010, retrieved from the internet https://www.youtube.com/watch?v=JCgDW5bru9M.
Official Communication for European Patent Application No. 15165244.3 dated Aug. 27, 2015.
Perdisci et al., "Behavioral Clustering of HTTP-Based Malware and Signature Generation Using Malicious Network Traces," USENIX, Mar. 18, 2010, pp. 1-14.
Official Communication for European Patent Application No. 14159464.8 dated Sep. 22, 2014.
Official Communication for Great Britain Patent Application No. 1404489.5 dated Aug. 27, 2014.
Official Communication for Australian Patent Application No. 2014250678 dated Jun. 17, 2015.
Nierman, "Evaluating Structural Similarity in XML Documents", 6 pages, 2002.
Official Communication for European Patent Application No. 14191540.5 dated May 27, 2015.
Official Communication for European Patent Application No. 14186225.0 dated Feb. 13, 2015.
Wollrath et al., "A Distributed Object Model for the Java System," Conference on Object-Oriented Technologies and Systems, Jun. 17-21, 1996, pp. 219-231.
Microsoft, "Managing Versions and Checking Documents in and Out (Windows SharePoint Services 2.0)," <http://technet.microsoft.com/en-us/library/cc287876.aspx>, Aug. 22, 2005 in 2 pages.
Miklau et al., "Securing History: Privacy and Accountability in Database Systems", 3rd Biennial Conference on Innovative Data Systems Research (CIDR), pp. 387-396, Asilomar, California, Jan. 7-10, 2007.

(56) References Cited

OTHER PUBLICATIONS

Official Communication for New Zealand Patent Application No. 627962 dated Aug. 5, 2014.
"A Word About Banks and the Laundering of Drug Money," Aug. 18, 2012, http://www.golemxiv.co.uk/2012/08/a-word-about-banks-and-the-laundering-of-drug-money/.
Official Communication for Great Britain Patent Application No. 1404486.1 dated Aug. 27, 2014.
Klemmer et al., "Where Do Web Sites Come From? Capturing and Interacting with Design History," Association for Computing Machinery, CHI 2002, Apr. 20-25, 2002, Minneapolis, MN, pp. 8.
Official Communciation for Great Britain Patent Application No. 1411984.6 dated Dec. 22, 2014.
Microsoft Office—Visio, "About connecting shapes," <http://office.microsoft.com/en-us/visio-help/about-connecting-shapes-HP085050369.aspx> printed Aug. 4, 2011 in 6 pages.
International Search Report and Written Opinion for Patent Application No. PCT/US2009/056700 dated Apr. 19, 2010.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Official Communication for European Patent Application No. 14189344.6 dated Feb. 20, 2015.
European Patent Office, "Search Report" in application No. 08730336.8-1951, dated Oct. 19, 2016, 4 pages.
Official Communication for European Patent Application No. 13170952.9 dated Jan. 21, 2014.
Official Communication for European Patent Application No. 15175106.2 dated Nov. 5, 2015.
Boyce, Jim, "Microsoft Outlook 2010 Inside Out," Aug. 1, 2010, retrieved from the internet https://capdtron.files.wordpress.com/2013/01/outlook-2010-inside_out.pdf.
Microsoft Windows, "Microsoft Windows Version 2002 Print Out 2," 2002, pp. 1-6.
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for Great Britain Patent Application No. 1413935.6 dated Jan. 27, 2015.
Map of San Jose, CA. Retrieved Oct. 2, 2013 from http://maps.yahoo.com.
Conner. Nancy. "Google Apps: The Missing Manual," May 1, 2008. pp. 15.
Official Communication for European Patent Application No. 15175151.8 dated Nov. 25, 2015.
International Search Report and Written Opinion in Application No. PCT/US2009/056703, dated Mar. 15, 2010.
Wright et al., "Palantir Technologies VAST 2010 Challenge Text Records _ Investigations into Arms Dealing," Oct. 29, 2010, pp. 1-10.
Gu et al., "Record Linkage: Current Practice and Future Directions," Jan. 15, 2004, pp. 32.
Official Communication for Netherlands Patent Application No. 2011729 dated Aug. 13, 2015.
Official Communication for European Patent Application No. 08730336.8 dated Jun. 6, 2012.
Official Communication for European Patent Application No. 151832721.8 dated Nov. 23, 2015.
"Money Laundering Risks and E-Gaming: A European Overview and Assessment," 2009, http://www.cf.ac.uk/socsi/resources/Levi_Final_Money_Laundering_Risks_egaming.pdf.
Huff et al., "Calibrating the Huff Model Using ArcGIS Business Analyst," ESRI, Sep. 2008, pp. 33.
Official Communication for New Zealand Patent Application No. 624557 dated May 14, 2014.
Acklen, Laura, "Absolute Beginner's Guide to Microsoft Word 2003," Dec. 24, 2003, pp. 15-18, 34-41, 308-316.
Beverley, Bill, "Windows Tips & Tricks," <http://alamopc.org/pcalamode/columns/beverley/bb0301.shtml>, Mar. 2001 in 5 pages.
Quest, "Toad for ORACLE 11.6—Guide to Using Toad," Sep. 24, 2012, pp. 1-162.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Official Communication for European Patent Application No. 15183721.8 dated Nov. 23, 2015.
Official Communication for European Patent Application No. 14189347.9 dated Mar. 4, 2015.
Chaudhuri et al., "An Overview of Business Intelligence Technology," Communications of the ACM, Aug. 2011, vol. 54, No. 8.
Official Communication for New Zealand Patent Application No. 628161 dated Aug. 25, 2014.
Peng et al., "Large-scale Incremental Processing Using Distributed Transactions and Notifications", Proceedings of the 9th USENIX Symposium on Operating Systems Design and Implementation, USENIX, p. 14, 2010.
Huff, David L., "Parameter Estimation in the Huff Model," ESRI, ArcUser, Oct.-Dec. 2003, pp. 34-36.
Official Communication for European Patent Application No. 15155845.9 dated Oct. 6, 2015.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Official Communication for European Patent Application No. 14197938.5 dated Apr. 28, 2015.
Delcher et al., "Identifying Bacterial Genes and Endosymbiont DNA with Glimmer," BioInformatics, vol. 23, No. 6, 2007, pp. 673-679.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Official Communication for New Zealand Patent Application No. 628585 dated Aug. 26, 2014.
Bluttman et al., "Excel Formulas and Functions for Dummies," 2005, Wiley Publishing, Inc., pp. 280, 284-286.
Notice of Acceptance for Australian Patent Application No. 2014250678 dated Oct. 7, 2015.
JetScreenshot.com, "Share Screenshots via Internet in Seconds," <http://web.archive.org/web/20130807164204/http://www.jetscreenshot.com/>, Aug. 7, 2013, pp. 1.
Official Communication for European Patent Application No. 14180281.9 dated Jan. 26, 2015.
Map of San Jose, CA. Retrieved Oct. 2, 2013 from http://maps.google.com.
Chang et al., "Bigtable: A Distributed Storage System for Structured Data", Google, Inc., OSDI'06: Seventh Symposium on Operating System Design and Implementation, Seattle, WA, Nov. 2006.
Official Communication for European Patent Application No. 12173312.5 dated Oct. 25, 2012.
International Search Report for International Patent Application No. PCT/US2008/054511 dated Jul. 31, 2008.
O'Reilly.com, http://oreilly.com/digitalmedia/2006/01/01/mac-os-x-screenshot-secrets.html published Jan. 1, 2006 in 10 pages.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Mizrachi, Ilene, "Chapter 1: GenBank: The Nuckeotide Sequence Database," The NCBI Handbook, Oct. 2002, pp. 1-14.
Official Communication for Great Britain Patent Application No. 1404574.4 dated Dec. 18, 2014.
Official Communication for Netherlands Patent Application No. 2012437 dated Sep. 18, 2015.
Kitts, Paul, "Chapter 14: Genome Assembly and Annotation Process," The NCBI Handbook, Oct. 2002, pp. 1-21.

(56) References Cited

OTHER PUBLICATIONS

"A Quick Guide to UniProtKB Swiss-Prot & TrEMBL," Sep. 2011, pp. 2.
"The FASTA Program Package," fasta-36.3.4, Mar. 25, 2011, pp. 29.
Madden, Tom, "Chapter 16: The BLAST Sequence Analysis Tool," The NCBI Handbook, Oct. 2002, pp. 1-15.
Kahan et al., "Annotea: an Open RDF Infrastructure for Shared Web Annotations", Computer Networks, Elsevier Science Publishers B.V., vol. 39, No. 5, dated Aug. 5, 2002.

FIGURE 1

| DATASET 100A | | |
|---|---|---|
| FIELD 102A | FIELD 102B | FIELD 102C |
| FIELD VALUE 104A | FIELD VALUE 104D | FIELD VALUE 104G |
| FIELD VALUE 104B | FIELD VALUE 104E | FIELD VALUE 104H |
| FIELD VALUE 104C | FIELD VALUE 104F | FIELD VALUE 104I |

⋮

| DATASET 100N | |
|---|---|
| FIELD 102M | FIELD 102N |
| FIELD VALUE 104D | FIELD VALUE 104M |
| FIELD VALUE 104E | FIELD VALUE 104N |
| FIELD VALUE 104F | FIELD VALUE 104N |

FIGURE 7

COMPOSITE DATASET 700

| FIELD 102B | FIELD 102C | FIELD 102N |
|---|---|---|
| FIELD VALUE 104E | FIELD VALUE 104H | FIELD VALUE 104N |
| FIELD VALUE 104F | FIELD VALUE 104I | FIELD VALUE 104N |

AUTOMATIC GENERATION OF COMPOSITE DATASETS BASED ON HIERARCHICAL FIELDS

PRIORITY CLAIM

This application claims the benefit under 35 U.S.C. § 120 as a Continuation of application Ser. No. 14/996,179, filed Jan. 14, 2016, which claims the benefit under 35 U.S.C. § 119(e) of Provisional Application 62/268,743, filed Dec. 17, 2015, the entire contents of each of the above-listed application are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present Application relates to information retrieval technology. More specifically, the example embodiment(s) of the present Application relate to automatic generation of composite datasets based on hierarchical fields.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Information retrieval typically requires a user to have a minimum level of skill with a particular query language. Furthermore, in order to properly construct a query, the user must often know how stored data is structured. For example, a user who wishes to retrieve information from a Structured Query Language (SQL) database may need to be familiar with both SQL and the database schema.

Although user interfaces may be used to push some of the requisite skill for users to programmers, the user interfaces may be limited in the complexity and efficiency of the queries they can be used to generate. For example, web interfaces that employ drop-down menus can be used to specify a limited number of predetermined query parameters. Furthermore, the predetermined query parameters may be used to construct a query that is executed in an inefficient order.

BRIEF DESCRIPTION OF THE DRAWINGS

The example embodiment(s) of the present invention are illustrated, by way of example and not limitation, in the accompanying drawings and in which like reference numerals refer to similar elements and in which:

FIG. 1 depicts a plurality of example datasets.
FIG. 7 depicts an example composite dataset generated based on a filtered dataset.

DESCRIPTION OF THE EXAMPLE EMBODIMENT(S)

Figure 2:
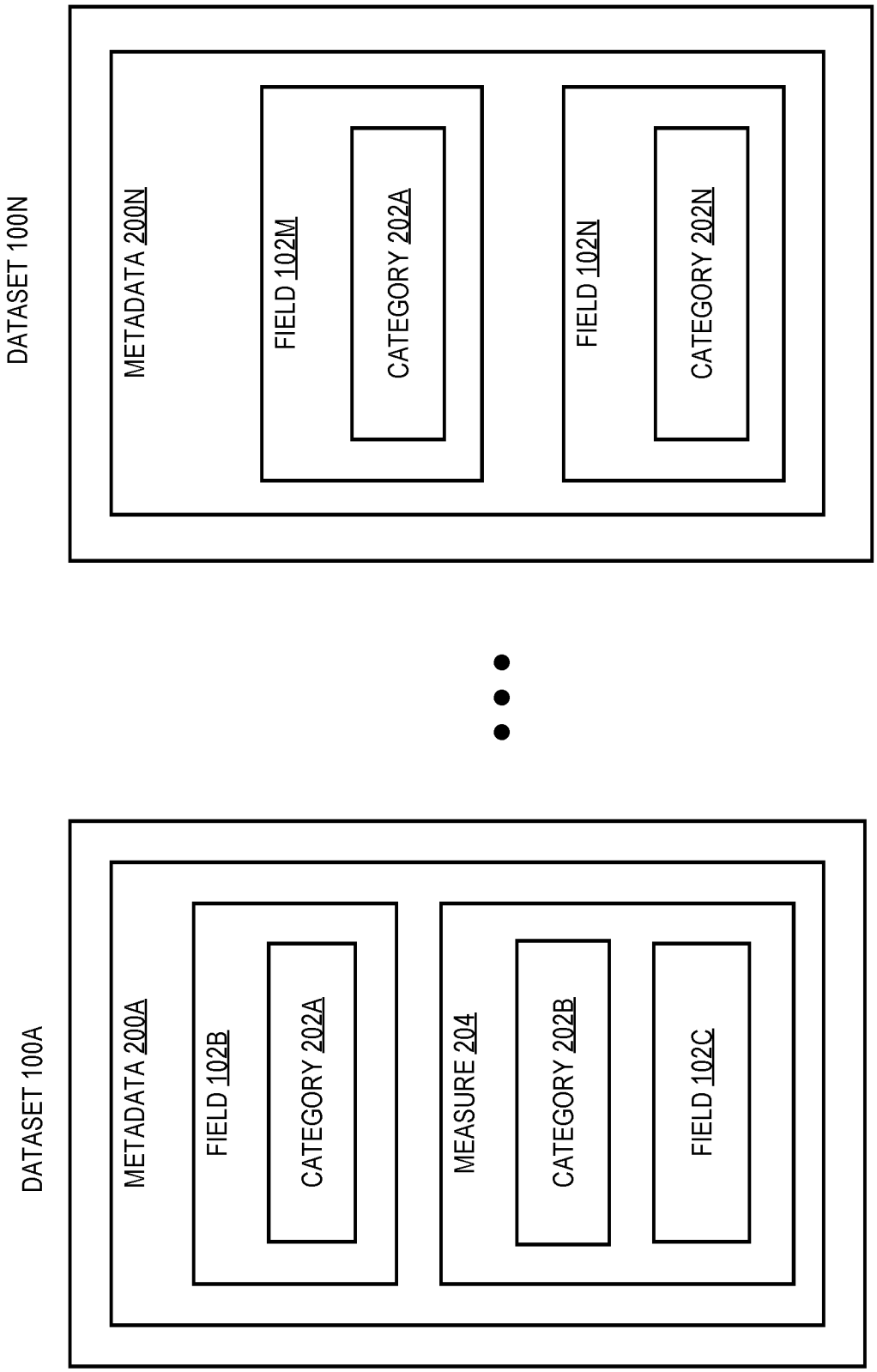
FIG. 2 depicts example annotated datasets.

In the following description, for the purposes of explanation, numerous specific details are set forth in order to provide a thorough understanding of the example embodiment(s) the present Application. It will be apparent, however, that the example embodiment(s) may be practiced without these specific details. In other instances, well-known structures and devices are shown in block diagram form in order to avoid unnecessarily obscuring the example embodiment(s). Modifiers such as "first" and "second" may be used to differentiate elements, but the modifiers do not necessarily indicate any particular order.

General Overview

Computer-implemented techniques for automatic generation of composite datasets based on hierarchical fields are described. In some example embodiments, datasets are annotated with metadata that indicates the interrelationships between/among the datasets. More specifically, the metadata associates categories with dataset fields. Furthermore, a hierarchy mapping indicates hierarchical relationships between/among different categories.

In some example embodiments, the techniques encompass a computer-implemented method performed at one or more computing devices comprising one or more processors and storage media storing one or more computer programs executed by the one or more processors to perform the method. Performance of the method involves performing operations related to query processing that automatically determines which data to use for efficient query execution.

In some example embodiments, the method includes interpreting a natural language query that specifies a first granularity level. The first granularity level indicates a particular category and one or more field values that correspond to the particular category. One or more dataset filters are generated based on the first granularity level. The one or more dataset filters are used to discard, from one or more datasets, any data that is unnecessary for query processing and/or execution.

In some example embodiments, a query result can be returned based on retrieving data from a pre-existing dataset that is determined to be the most relevant dataset for query processing and/or execution. However, in other example embodiments, the method includes generating a composite dataset from which to retrieve the data for returning a query result. The composite dataset is generated based on joining two or more datasets that are among the most relevant datasets for query processing and/or execution. Relevancy is determined based on one or more predetermined criteria. For example, the hierarchy mapping can be used to identify one or more hierarchically related categories of the particular category that was indicated by the query. The two or more datasets can be selected based, at least in part, on their having at least one hierarchically related category in common.

In some example embodiments, the method includes modifying the one or more dataset filters to discard unnecessary data from at least one dataset of the two or more datasets. Modification includes translating the one or more dataset filters to a second granularity level that indicates the at least one hierarchically related category.

In some example embodiments, the two or more datasets are joined after applying any translated dataset filters. Data can be retrieved from the resulting composite dataset to return a query result. A query result can include the data and/or a derivative of the data. For example, any of a number of computations can be performed on the data to generate the derivative.

Datasets

FIG. 1 depicts a plurality of example datasets. Referring to FIG. 1, dataset 100A includes fields 102A-C, and dataset 100N includes fields 102M-N. Each field includes field values. For example, field 102A includes field values 104A-C, and field 102M includes field values 104D-F.

Datasets 100A-N can be any structured information stored in volatile and/or non-volatile memory. Example datasets 100A-N include Structured Query Language (SQL) database tables and Spark SQL Resilient Distributed Datasets (RDDs). Each dataset of datasets 100A-N can be organized according to fields 102A-N. Each field of fields 102A-N can be a column, a row, or any other data structure within a dataset. Each field of fields 102A-N can store any of a number of field values 104A-N. With the exception of null field values, all field values that are included in a particular field are typically of the same type. At a minimum, the field values in a particular field typically share a common data type, such as integer, string, etc. However, they also typically share a common field type. For example, the field values "San Jose", "Palo Alto", and "San Francisco" share the common field type of "City". The common field type of the field values in a particular field is referred to hereinafter as the "category" of the field. Other geospatial categories can include "ZIP code", "State", "Region", etc.

For ease of explanation, the datasets of FIG. 1 can be represented by the following example tables:

| Dataset A | | |
| --- | --- | --- |
| Date (field 102A) | ZIP Code (field 102B) | Sales Revenue (field 102C) |
| Oct. 31, 2015 (field value 104A) | 98122 (field value 104D) | $3.2 MM (field value 104G) |
| Nov. 26, 2015 (field value 104B) | 95113 (field value 104E) | $1.9 MM (field value 104H) |
| Dec. 25, 2015 (field value 104C) | 94301 (field value 104F) | $5.4 MM (field value 104I) |

| Dataset N | |
| --- | --- |
| ZIP Code (field 102M) | State (field 102N) |
| 98122 (field value 104D) | Washington (field value 104M) |
| 95113 (field value 104E) | California (field value 104N) |
| 94301 (field value 104F) | California (field value 104N) |

Each table column stores values that share a common category. For example, the "ZIP Code" columns store values of the "ZIP Code" category, and the "State" column stores values of the "State" category. As illustrated in the examples above, each category may correspond to one or more fields 102A-N. Annotating datasets 100A-N with categories that are included in the datasets 100A-N can be useful for determining relationships between the datasets 100A-N.

Annotated Datasets

FIG. 2 depicts example annotated datasets. Referring to FIG. 2, dataset 100A is associated with metadata 200A, and dataset 100N is associated with metadata 200N. Metadata 200A associates field 102B with category 202A. Metadata 200A also associates measure 204 with category 202B and field 102C. Metadata 200N associates field 102M and 102N with category 202A and category 202N, respectively.

Each dataset of datasets 100A-N can be annotated with respective metadata. The respective metadata can be stored with a corresponding dataset and/or separately from a corresponding dataset (e.g., in a database dictionary). Metadata 200A-N associates at least some of fields 102A-N with categories 202A-N. Metadata 200A-N can also associate a measure with a category and/or a field.

Measure

Measures include any of a number of computations that can be performed using data stored in datasets 100A-N. For example, measures can include demographic statistics, revenue statistics, etc. Each measure can be associated with a category that describes a type of computation that is performed. For example, a measure can correspond to a "sum" category, a "weighted mean" category, etc. Each measure can also be associated with at least one field upon which the measure is dependent. A measure is dependent upon one or more fields in a dataset that are necessary to compute the measure for the dataset. In the example of Dataset A above, measure 204 can be a "total sales revenue" measure of the "sum" category. The "total sales revenue" measure is dependent on the values in the "Sales Revenue" column. A measure can also be dependent upon another measure. For example, a "November percentage of total sales revenue" measure is dependent on the "total sales revenue" measure.

Hierarchy Mapping

Figure 3:
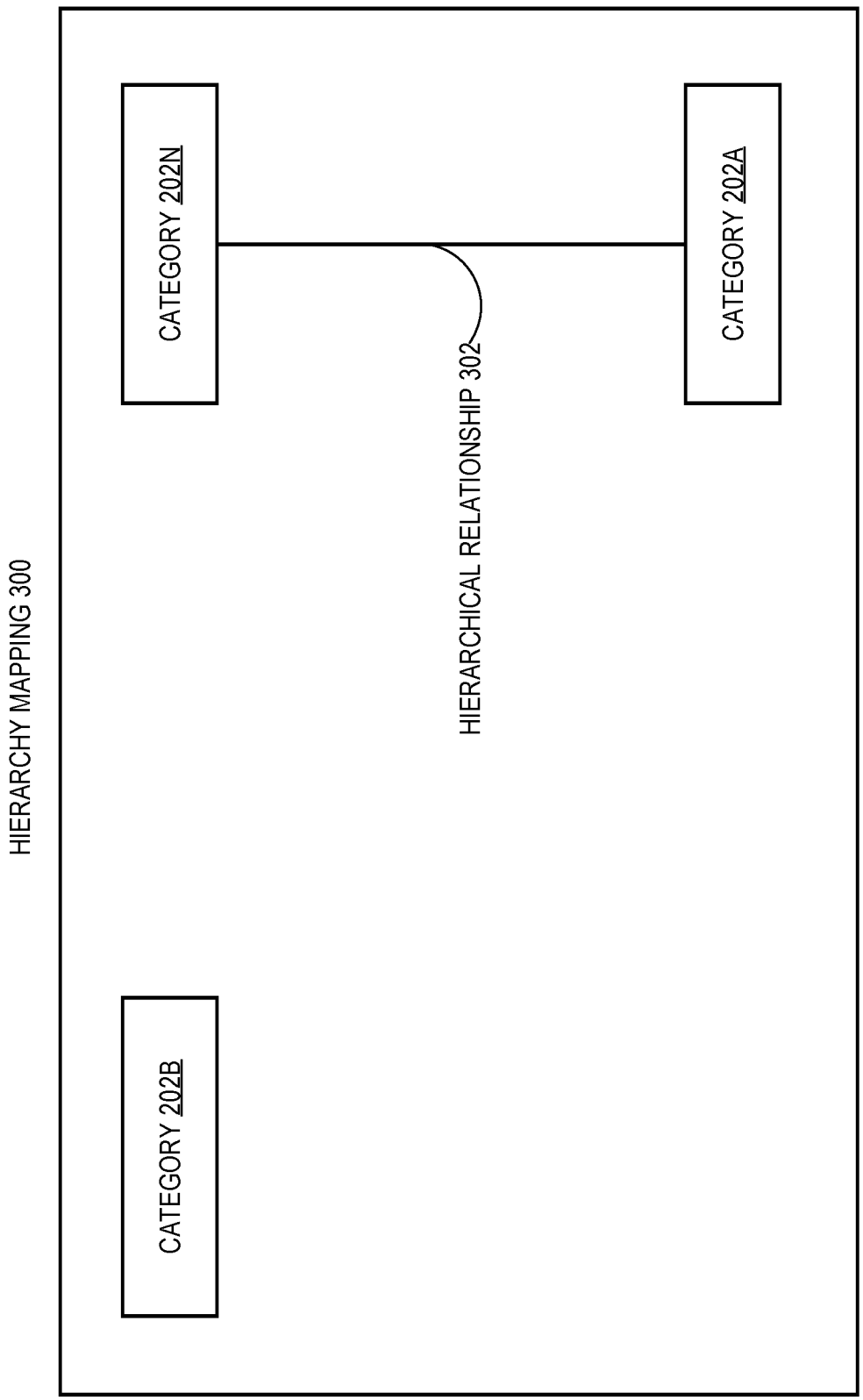
FIG. 3 depicts an example hierarchy mapping.

FIG. 3 depicts an example hierarchy mapping. Referring to FIG. 3, hierarchy mapping 300 includes category 202A, category 202B, and category 202N. Category 202A and category 202N exhibit a hierarchical relationship 302 with respect to each other.

Hierarchy mapping 300 indicates a hierarchical relationship 302 between different categories. In FIG. 3, category 202A is a subcategory of category 202N, and category 202N is a supercategory of category 202A. For example, in Dataset N above, category 202A is a "ZIP Code" category that is a subcategory of category 202N, which is a "State" category. The closeness of a hierarchical relationship 302 between two categories is hereinafter referenced as a "distance" between the two categories. For example, the distance between a "ZIP Code" category and a "City" category is smaller than the distance between a "ZIP Code" category and a "State" category.

Hierarchy mapping 300 can be stored with a dataset or separately from a dataset. For example, hierarchy mapping 300 can be stored in metadata 200A. Hierarchy mapping 300 can indicate all categories that are hierarchically related to a particular category, regardless of whether all the categories are included in a single dataset. For example, even if category 202N does not correspond to any of fields 102A-C in dataset 100A, metadata 200A can include a hierarchy mapping 300 that indicates category 202N is hierarchically related to category 202A in dataset 100A. Additionally or alternatively, hierarchy mapping 300 can indicate all possible field values that correspond to a particular category. For example, hierarchy mapping 300 can indicate all fifty states that correspond to the "State" category.

Natural Language Query

Figure 4:
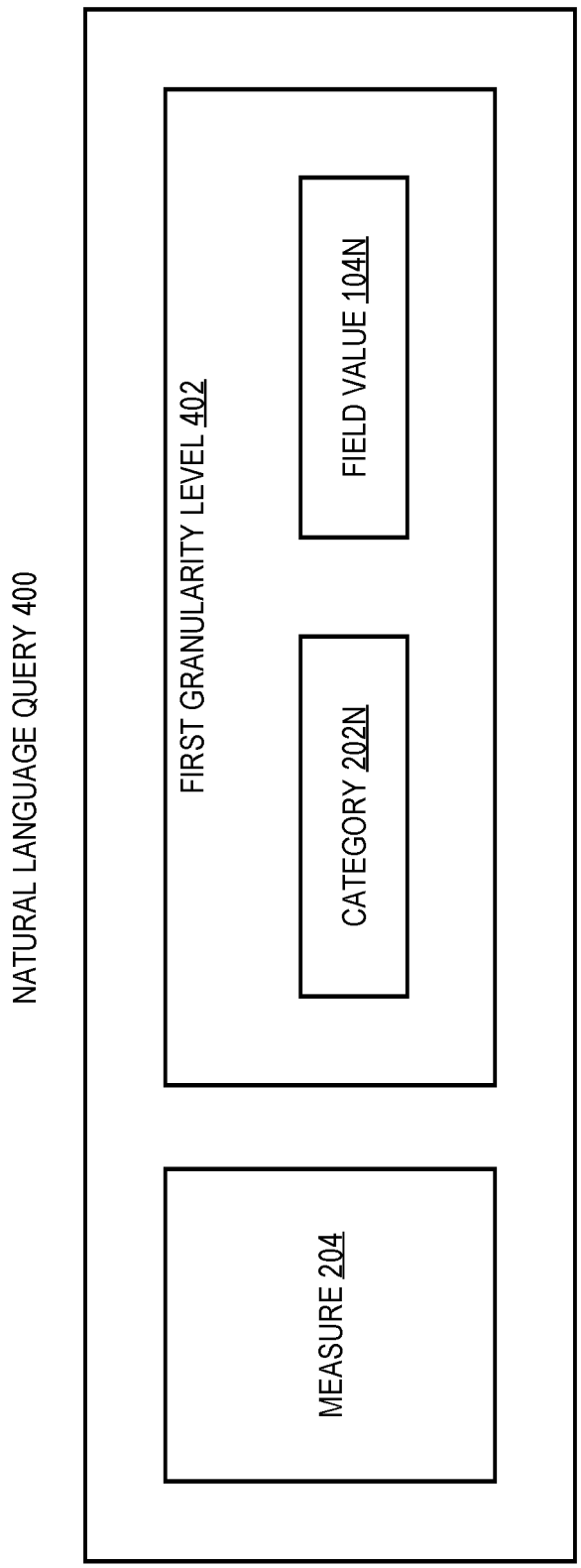
FIG. 4 depicts an example query.

FIG. 4 depicts an example query. Referring to FIG. 4, natural language query 400 specifies measure 204 and first granularity level 402. First granularity level 402 indicates category 202N and field value 104N.

Natural language query 400 can be any information request that is composed in a human language (e.g., conversational English) instead of a computer language (e.g., SQL). For example, the SQL query "SELECT Sales Revenue FROM Dataset A WHERE ZIP Code=95113" can be composed as the natural language query 400 "Sales revenue for 95113". In other words, natural language query 400 can refer to a query that consists only of normal terms in a user's language, without any special syntax or format. For example, natural language query 400 can be a statement, a question, or a simple list of keywords.

Note that natural language query 400 can indicate a category based on implicitly or explicitly referencing the category. In other words, it is unnecessary for the natural language query 400 to be composed as "Sales revenue for the ZIP code 95113". As will be described in greater detail in FIG. 9, natural language query 400 can be constructed in any of a number of different ways. For example, a drop-down menu corresponding to ZIP codes can list "95113" among the selectable choices. As another example, "95113" can be automatically recognized as a ZIP code based on natural language processing. Thus, a computer can automatically associate a specified field value with an unspecified category.

Dataset Filter

Figure 5:
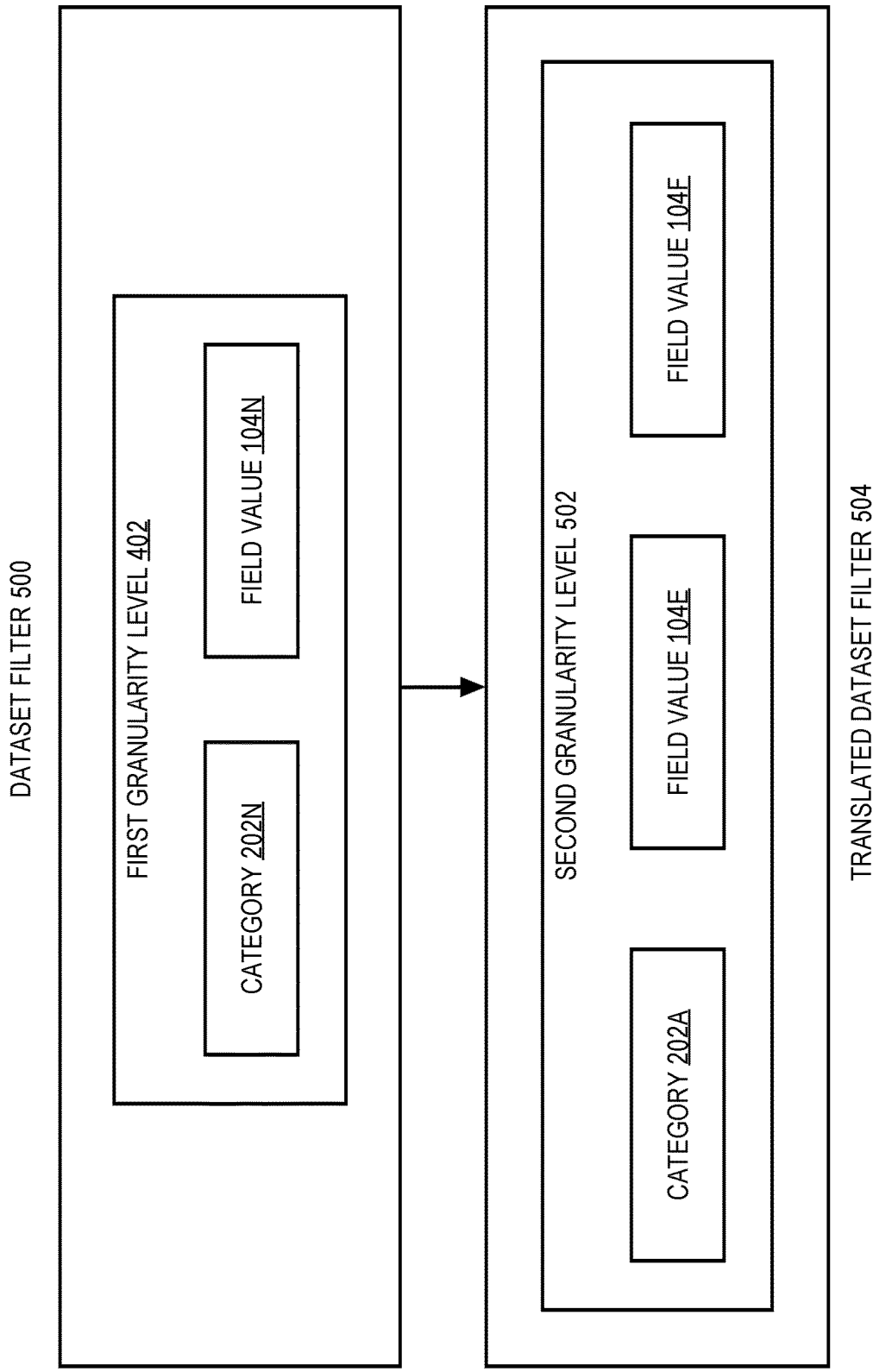
FIG. 5 depicts example dataset filters.

FIG. 5 depicts example dataset filters. Referring to FIG. 5, dataset filter 500 includes first granularity level 402, which further includes category 202N and field value 104N. Translated dataset filter 504 includes second granularity level 502, which further includes category 202A, field value 104E, and field value 104F.

A dataset filter (e.g., dataset filter 500, translated dataset filter 504) can be a function, method, procedure, or any other set of instructions that can cause discarding data that is unnecessary for query processing and/or execution. A dataset filter can be composed in a data manipulation language (DML) to cause discarding unnecessary data from a particular dataset. For example, the Spark SQL "filter" verb can be used to construct a dataset filter. Dataset filters can be constructed from a query parameter or any other query portion that implicitly or explicitly indicates a category and one or more corresponding field values. In some example embodiments, dataset filters can be used to perform dataset translation, which will be described in greater detail hereinafter.

For example, the natural language query 400 "Sales revenue by ZIP code in California" specifies a measure 204, a category for the query result, and a first granularity level 402. The measure 204 is "Sales revenue". The category for the query result is "ZIP code". The first granularity level 402 is "California". The first granularity level implicitly indicates a category of "State" and explicitly indicates a field value of "California". Thus, a dataset filter can be composed to cause discarding, from a dataset, any rows that have a value other than "California" in the "State" column.

Dataset Selection

In some example embodiments, further efficiency can be realized based on minimizing the number of datasets to which dataset filters will be applied. Minimizing the number of datasets can be achieved based on selecting datasets that are among the most relevant for query processing and/or execution. Relevancy can be determined based on any of a number of predetermined criteria, such as the following:
    whether a particular dataset includes a subcategory of the category for the query result;
    the number of dataset filters that can be applied to a particular dataset;
    the distance between a category in a particular dataset and the category for the query result;
    the distance between a category in a particular dataset and a category indicated in a dataset filter.

In some example embodiments, dataset selection can proceed according to a selection algorithm. For example, the selection algorithm causes generating a set of relevant categories based on causing identifying the category for the query result and all subcategories of that category. Based on the set of relevant categories, the selection algorithm causes identifying datasets that include at least one of the subcategories in the set of relevant categories. Furthermore, the selection algorithm causes determining the number of dataset filters that can be applied to each dataset of the identified datasets. The selection algorithm can cause generating a ranking of the identified datasets according to the number of dataset filters that can be applied. Based on the ranking, the selection algorithm can cause selecting one or more datasets to which the largest number of dataset filters can be applied.

In some example embodiments, the selection algorithm can further reduce the number of selected datasets. For example, the selection algorithm can cause generating one or more distance rankings. The one or more distance rankings can be determined based on the distance between the category for the query result and a category in a particular dataset. Additionally or alternatively, the one or more distance rankings can be determined based on the distance between the category for the query result and a category indicated in a dataset filter.

In some example embodiments, the number of selected datasets can be further reduced based on any of a number of arbitrary rankings. For example, a lexicographic ranking can be generated based on the name of a dataset. Thus, the dataset with the name "Sales" can be selected over the dataset with the name "State".

Dataset Filtration

In some example embodiments, data in the selected datasets can be filtered based on necessity for query processing and/or query execution. For example, a filtration algorithm can cause determining which fields in a particular dataset are unnecessary fields and discarding the unnecessary fields. Necessity can be determined based on any of a number of predetermined filtration criteria, including whether a category that corresponds to a particular field is hierarchically related to a category for the query result, a category for a measure 204, and/or a category indicated in a dataset filter. Additionally or alternatively, the filtration algorithm can cause applying one or more dataset filters to the selected datasets.

For example, natural language query 400 can be "Sales revenue by ZIP code in California". Unnecessary columns can be discarded based on predetermined filtration criteria. Referring to the example of Dataset A above, the "Date" column can be discarded, because it is not hierarchically related to a category for the query result (e.g., ZIP code), a category for a measure 204 (e.g., Sales revenue), and/or a category indicated in a dataset filter (e.g., State). Additionally or alternatively, unnecessary rows can be discarded based on applying one or more dataset filters to the selected datasets. Referring to the example of Dataset N above, the row that includes "Washington" can be discarded, because it does not include the field value "California". Thus, a filtered version of Dataset N can be represented as the following table:

| Filtered Dataset N | |
| --- | --- |
| ZIP Code | State |
| 95113 | California |
| 94301 | California |

Dataset Filter Translation

Applying a dataset filter to a dataset can be simple if, as in the previous example, a category indicated in the dataset filter matches a category that corresponds to a field in the dataset. However, if the category indicated in the dataset filter fails to match any categories associated with the dataset, the dataset filter can be translated (e.g., demoted, promoted) to match a category that corresponds to a field in the dataset.

FIG. 5 depicts translated dataset filter 504 is generated to apply dataset filter 500 to dataset 100A. Dataset filter 500 includes category 202N, which is absent from dataset 100A. However, dataset 100A includes category 202A, which is hierarchically related to category 202N according to hierarchy mapping 300. Based on hierarchy mapping 300, first granularity level 402 can be translated to second granularity level 502. Referring to the example of Dataset A above, dataset filter 500 and translated dataset filter 504 can be represented as {State→["California"]} and {ZIP Code→ ["95113", "94301"]}, respectively.

Filtered Dataset

Figure 6:
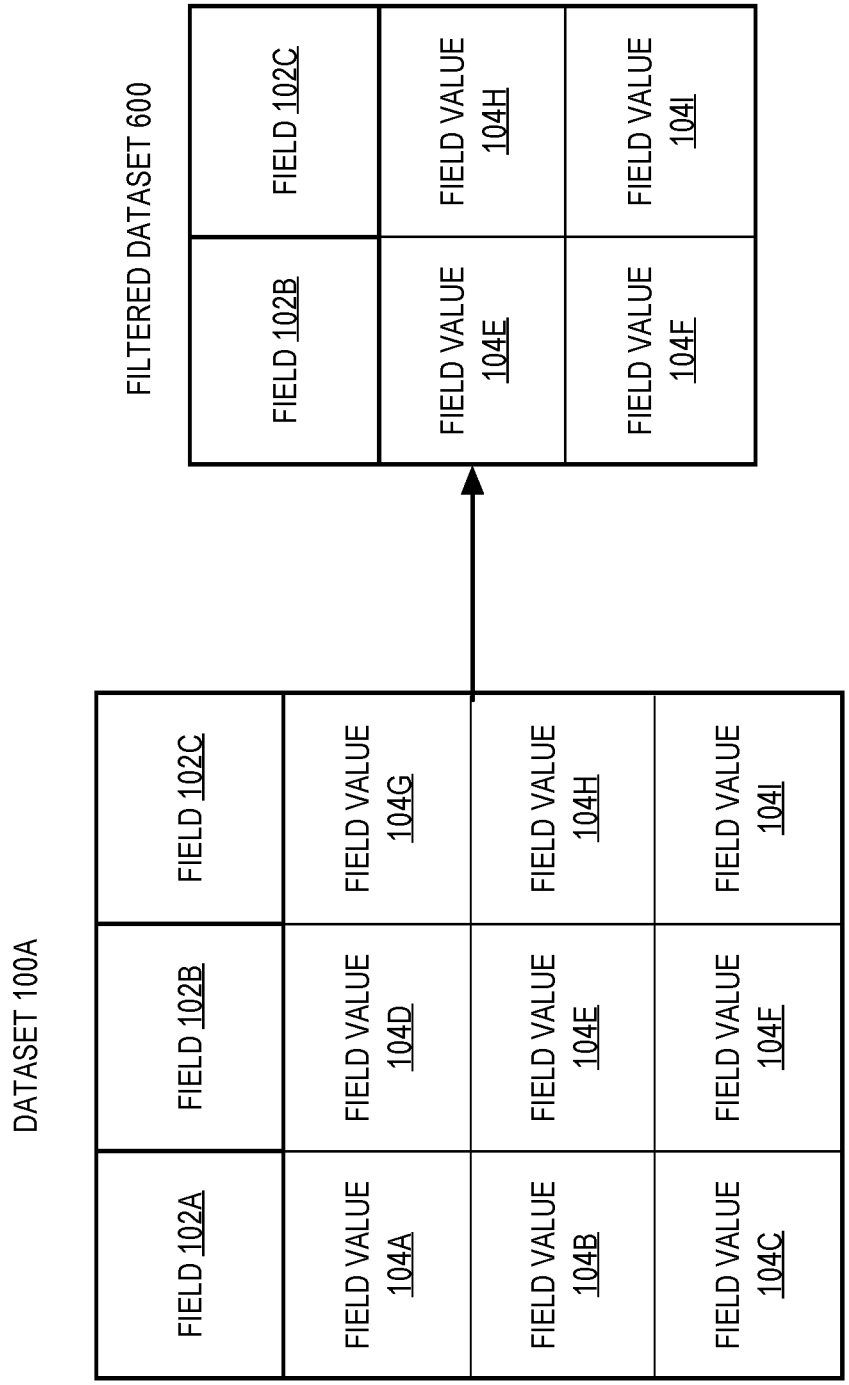
FIG. 6 depicts an example filtered dataset.

FIG. 6 depicts an example filtered dataset. Referring to FIG. 6, translated dataset filter 504 is applied to dataset 100A to generate filtered dataset 600. Filtered dataset 600 includes fields 102B-C. Field 102B includes field values 104E-F, and field 102C includes field values 104H-I. In terms of the example of Dataset A above, the abstraction of filtered dataset 600 can be represented as the following table:

| Filtered Dataset A | |
| --- | --- |
| ZIP Code | Sales Revenue |
| 95113 | $1.9 MM |
| 94301 | $5.4 MM |

In some example embodiments, a particular field included in filtered dataset 600 can subsequently be promoted to a category that matches the category for the query result. For example, if natural language query 400 had been "Sales Revenue in California", the example of Filtered Dataset A above can be promoted to include a "State" column to replace the "ZIP Code" column.

Composite Dataset

FIG. 7 depicts an example composite dataset generated based on a filtered dataset. Referring to FIG. 7, composite dataset 700 includes fields 102B, 102C, and 102N. Field 102B includes field values 104E-F, field 102C includes field values 104H-I, and field 102N includes two instances of field value 104N.

Generating a composite dataset 700 is unnecessary when all necessary data is included in a single dataset. However, when the necessary data is spread across multiple datasets, a composite dataset 700 can be generated based on performing a join operation. In some example embodiments, each dataset of the multiple datasets can be keyed based on the field that corresponds to the category for the query result. Additionally or alternatively, prior to performing the join operation, at least one dataset of the multiple datasets can include a field that is demoted to a level of a common subcategory that is shared by the multiple datasets.

Referring to the example of FIG. 7, composite dataset 700 is generated based on joining filtered dataset 600 to a filtered version of dataset 100N. In terms of the examples of Filtered Dataset A and Filtered Dataset N above, the abstraction of composite dataset 700 can be represented as the following table:

| Composite Dataset A | | |
| --- | --- | --- |
| ZIP Code | Sales Revenue | State |
| 95113 | $1.9 MM | California |
| 94301 | $5.4 MM | California |

In some example embodiments, the "State" column can be considered as unnecessary data, and generated composite dataset 700 can be avoided.

Query Result

Figure 8:
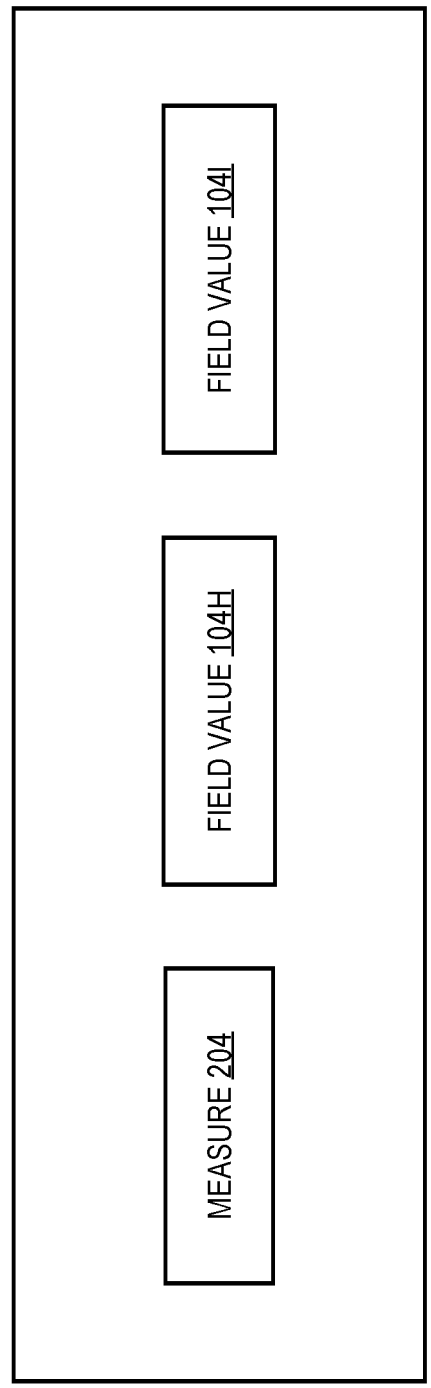
FIG. 8 depicts an example query result.

FIG. 8 depicts an example query result. Referring to FIG. 8, result 800 includes measure 204 and field values 104H-I. Result 800 is an abstraction that represents data (e.g., field values 104H-I) that is retrieved from a dataset and that represents a computation (e.g., measure 204) that is performed on the data. In some example embodiments, a computation is unnecessary, so the data retrieved from a dataset can be a query result.

For example, natural language query 400 can be "Sales Revenue for California". In terms of the example of Composite Dataset A above, data from the "Sales Revenue" column can be retrieved and summed to generate a query result. Thus, "$1.9MM" and "$5.4MM" can be added together to generate the query result "$7.3MM".

User Interface

Figure 9:
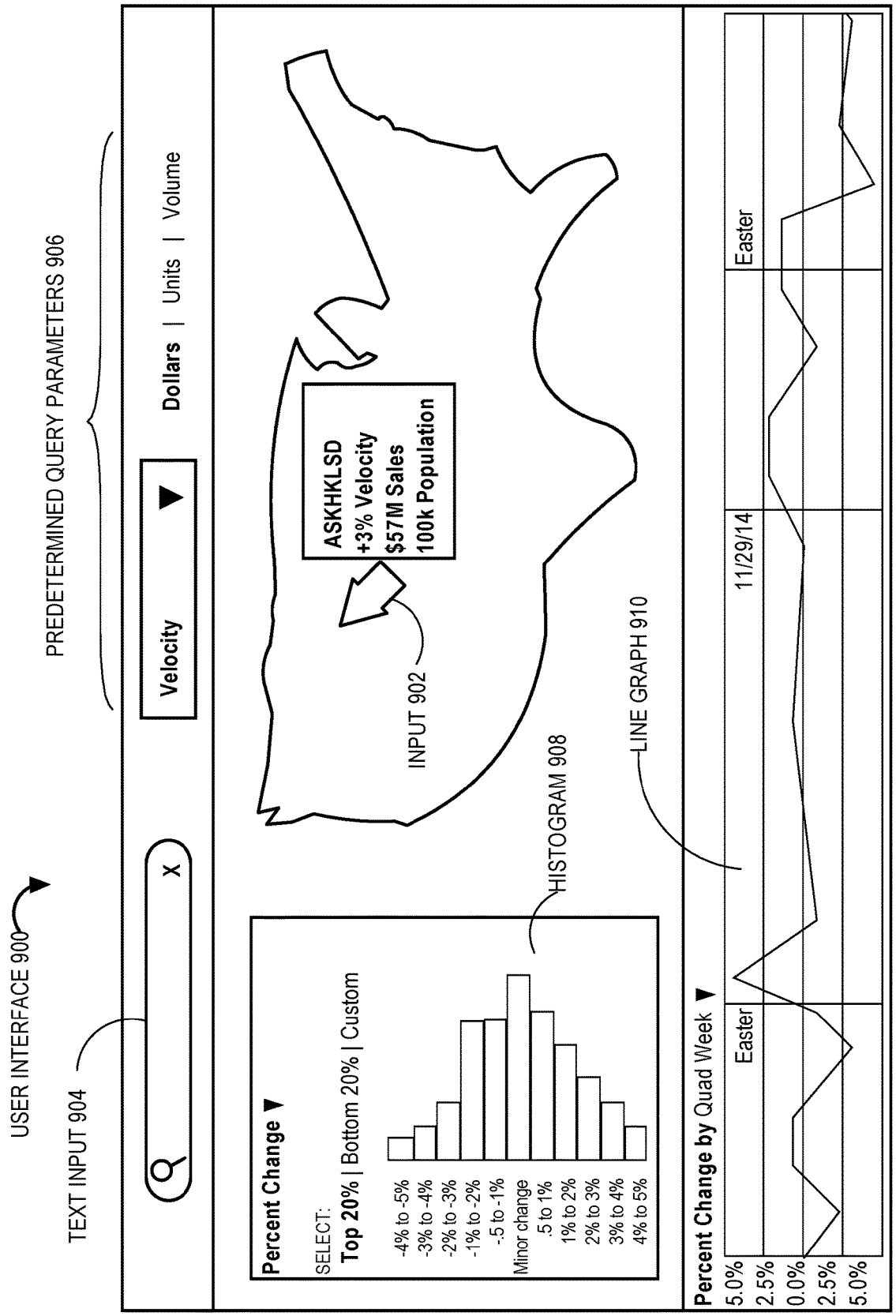
FIG. 9 depicts an example user interface that constructs a query.

FIG. 9 depicts an example user interface that constructs a query. Referring to FIG. 9, user interface 900 receives input 902 and text input 904. User interface 900 includes predetermined query parameters 906, histogram 908, and line graph 910.

Natural language query 400 can be constructed based on one or more inputs received at a user interface 900. The one or more inputs can be a hovering, a typing, and/or a clicking action at a selectable element of the user interface 900. For example, input 902 can be a hovering action over a map to select a particular region of the map. Text input 904 can be a string that is typed into a search field of the user interface 900. In some example embodiments, text input 904 can be autocompleted. Auto-completion can be based, at least in part, on the categories and measures included in hierarchy mapping 300. Predetermined query parameters 906 can include options in a vertically arranged menu, a horizontally arranged menu, etc.

In some example embodiments, user interface 900 can provide one or more visualizations of a query result. The visualizations can include a histogram 908, a line graph 910, a summary table, etc.

Further Optimizations

Further efficiency can be realized based on pre-computing one or more intermediate datasets that are stored in volatile and/or non-volatile memory. For example, the one or more intermediate datasets can include data that is frequently accessed, and the one or more intermediate datasets can be stored in a memory cache.

Promoted Datasets

Figure 10:
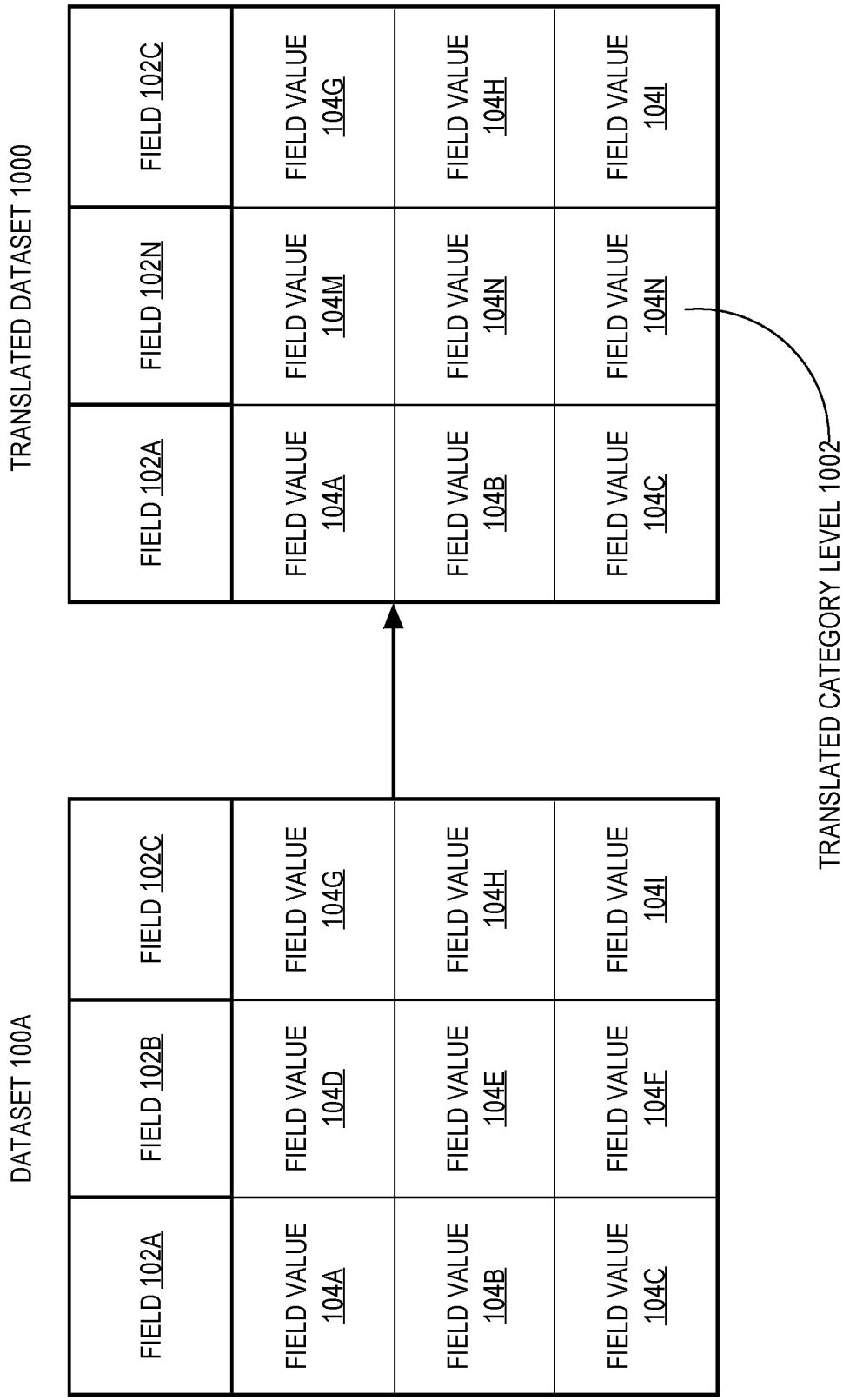
FIG. 10 depicts an example translated dataset.

In some example embodiments, an intermediate dataset can include a frequently accessed dataset that is promoted to a level of a frequently indicated category. Hereinafter, this intermediate dataset is referenced as "promoted dataset". FIG. 10 depicts an example promoted dataset. Referring to FIG. 10, translated dataset 1000 is generated based on promoting field 102B of dataset 100A to field 102N. Field 102N includes field values 104M-N, which exhibit a translated category level 1002. In other words, field 102B's category 202A has been promoted to field 102N's category 202N.

In terms of the example of Dataset A above, translated dataset 1000 can be represented as the following table:

| Promoted Dataset A | | |
| --- | --- | --- |
| Date | State | Sales Revenue |
| Oct. 31, 2015 | Washington | $3.2 MM |
| Nov. 26, 2015 | California | $1.9 MM |
| Dec. 25, 2015 | California | $5.4 MM |

Thus, if subsequently received queries include request for data in Dataset A at the State level, the data can simply be retrieved from Promoted Dataset A.

"View" Datasets

Figure 11:
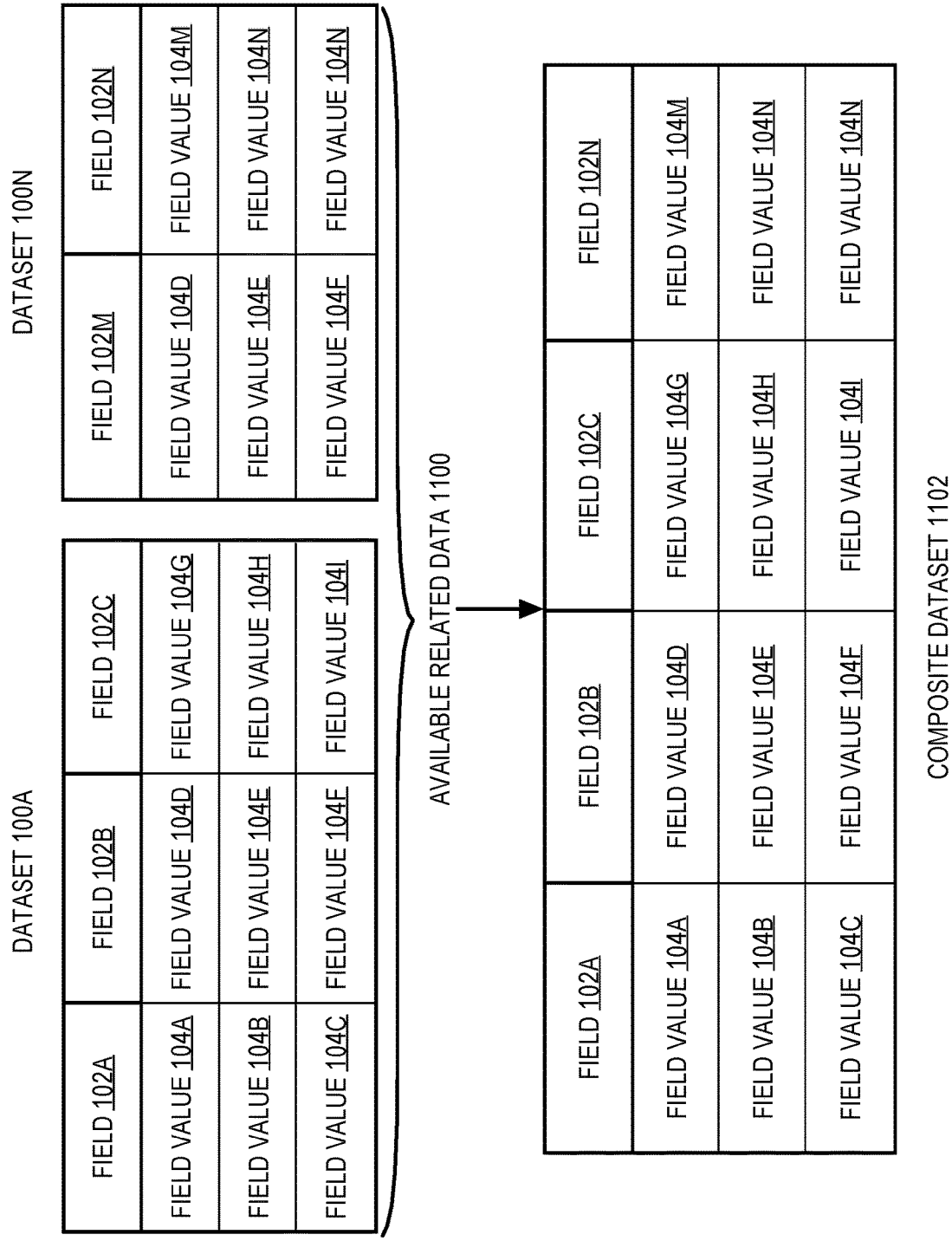
FIG. 11 depicts an example composite dataset generated based on all available data related to a particular category.

In some example embodiments, an intermediate dataset can include all available data that is related to a frequently indicated category. FIG. 11 depicts an example composite dataset generated based on all available data related to a particular category. Referring to FIG. 11, available related data 1100 includes dataset 100A and dataset 100N. Composite dataset 1102 is generated based on available related data 1102.

In terms of the examples of Dataset A and Dataset N above, composite dataset 1102 can be represented as the following table:

| Composite Dataset B | | | |
| --- | --- | --- | --- |
| Date | ZIP Code | Sales Revenue | State |
| Oct. 31, 2015 | 98122 | $3.2 MM | Washington |
| Nov. 26, 2015 | 95113 | $1.9 MM | California |
| Dec. 25, 2015 | 94301 | $5.4 MM | California |

Composite Dataset B can be a "view" table that represents the universe of available data related to ZIP codes.

Process Overview

Figure 12:
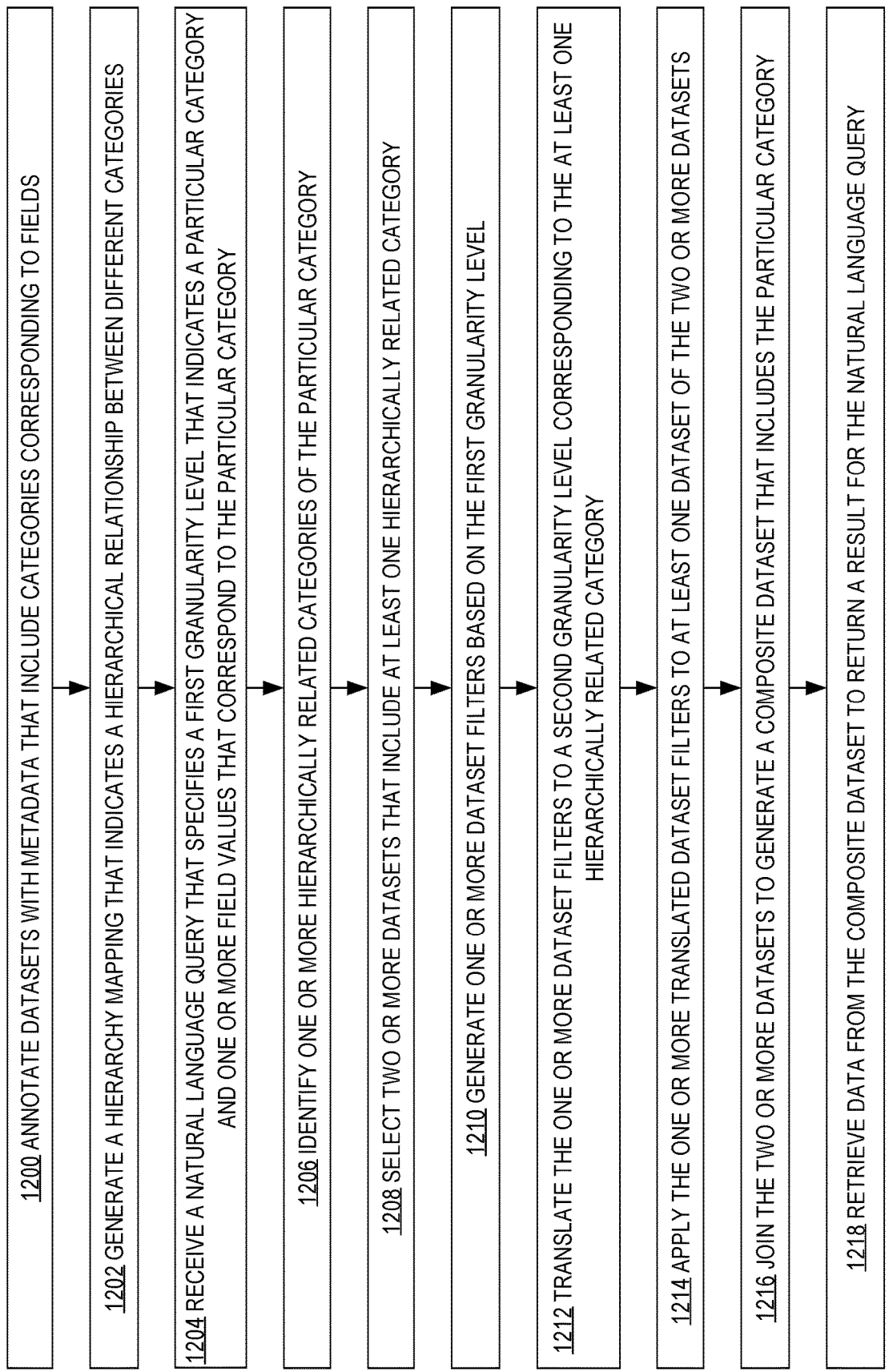
FIG. 12 is a flow diagram that depicts an approach for automatically generating composite datasets, according to some example embodiments of the present Application.

FIG. 12 is a flow diagram that depicts an approach for automatically generating composite datasets, according to some example embodiments of the present Application. At block 1200, datasets are annotated with metadata that include categories corresponding to fields. Each dataset can include multiple fields, and each category can correspond to one or more fields. Additionally or alternatively, the metadata can include one or more measures. Each measure of the one or more measures is dependent on at least one field.

At block 1202, a hierarchy mapping is generated. The hierarchy mapping indicates a hierarchical relationship between different categories. Block 1202 can be performed concurrently with or subsequent to block 1200.

At block 1204, a natural language query is received. The natural language query specifies a first granularity level. The first granularity level implicitly or explicitly indicates a particular category and one or more field values that correspond to the particular category. Additionally, the natural language query can specify a particular measure and/or a category that corresponds to a result for the natural language query.

The natural language query can be constructed based on one or more inputs received at a user interface. The user interface can include predetermined query parameters that are selectable. Additionally or alternatively, the natural language query can be constructed based on text input that is autocompleted. Additionally or alternatively, the natural language query can be constructed based on a mouse pointer that hovers over a map. For example, this hovering action can cause data to be retrieved from a particular composite dataset that is generated based on all available data related to the particular category.

At block 1206, one or more hierarchically related categories of the particular category are identified. This identification can be based on the hierarchy mapping.

At block 1208, two or more datasets that include at least one hierarchically related category are selected. This selection can include ranking at least some of the datasets based on the hierarchical relationship between the particular category and the at least one hierarchically related category. Additionally or alternatively, this selection can include ranking at least some of the datasets based on a number of the one or more hierarchically related categories that are included in a particular dataset.

At block 1210, one or more dataset filters are generated based on the first granularity level. Block 1210 can be performed prior to, concurrently with, or subsequent to block 1206.

At block 1212, the one or more dataset filters are translated to a second granularity level that corresponds to the at least one hierarchically related category. For example, the one or more dataset filters can be demoted to a subcategory of the particular category.

At block 1214, the one or more translated dataset filters are applied to at least one dataset of the two or more datasets. Optionally, the at least one dataset can be subsequently translated (e.g., promoted) to a level that corresponds to the particular category.

At block 1216, a composite dataset that includes the particular category can be generated. The composite dataset can be generated based on joining the two or more datasets. Block 1216 can be performed prior to, concurrently with, or subsequent to block 1212.

At block 1218, data is retrieve from the composite dataset to return a result for the natural language query. The result can be returned based on displaying the result as a line graph, summary table, or a histogram.

At any point in the example process of FIG. 12, if the at least one dataset is determined to be a frequently accessed dataset and if the particular category is determined to be a frequently indicated category, the at least one dataset can be translated (e.g., promoted) to a level of the particular category. After being translated, the at least one dataset can be stored for use with subsequently received queries.

Basic Computing Device

Figure 13:
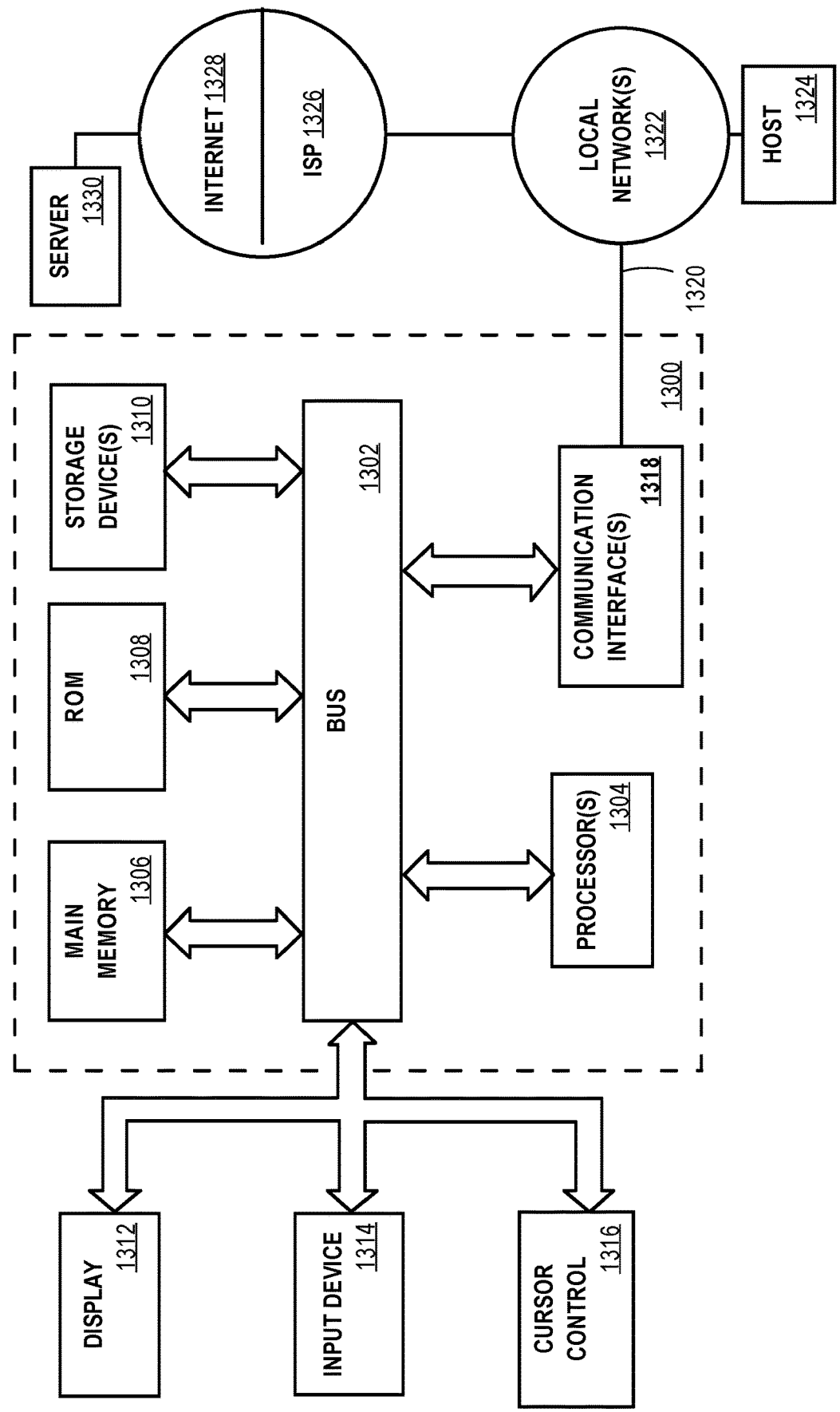
FIG. 13 is a very general block diagram of a computing device in which the example embodiment(s) of the present Application may be embodied.

Referring now to FIG. 13, it is a block diagram that illustrates a basic computing device 1300 in which the example embodiment(s) of the present Application may be embodied. Computing device 1300 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1300 may include a bus 1302 or other communication mechanism for addressing main memory 1306 and for transferring data between and among the various components of device 1300.

Computing device 1300 may also include one or more hardware processors 1304 coupled with bus 1302 for processing information. A hardware processor 1304 may be a general purpose microprocessor, a system on a chip (SoC), or other processor.

Main memory 1306, such as a random access memory (RAM) or other dynamic storage device, also may be coupled to bus 1302 for storing information and software instructions to be executed by processor(s) 1304. Main memory 1306 also may be used for storing temporary variables or other intermediate information during execution of software instructions to be executed by processor(s) 1304.

Software instructions, when stored in storage media accessible to processor(s) 1304, render computing device 1300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1300 also may include read only memory (ROM) 1308 or other static storage device coupled to bus 1302 for storing static information and software instructions for processor(s) 1304.

One or more mass storage devices 1310 may be coupled to bus 1302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1310 (e.g., the main hard disk for the device) stores a body of program and data for directing operation of the computing device, including an operating system, user application programs, driver and other support files, as well as other data files of all sorts.

Computing device 1300 may be coupled via bus 1302 to display 1312, such as a liquid crystal display (LCD) or other electronic visual display, for displaying information to a computer user. In some configurations, a touch sensitive surface incorporating touch detection technology (e.g., resistive, capacitive, etc.) may be overlaid on display 1312 to form a touch sensitive display for communicating touch gesture (e.g., finger or stylus) input to processor(s) 1304.

An input device 1314, including alphanumeric and other keys, may be coupled to bus 1302 for communicating information and command selections to processor 1304. In addition to or instead of alphanumeric and other keys, input device 1314 may include one or more physical buttons or switches such as, for example, a power (on/off) button, a "home" button, volume control buttons, or the like.

Another type of user input device may be a cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

While in some configurations, such as the configuration depicted in FIG. 13, one or more of display 1312, input device 1314, and cursor control 1316 are external components (i.e., peripheral devices) of computing device 1300, some or all of display 1312, input device 1314, and cursor control 1316 are integrated as part of the form factor of computing device 1300 in other configurations.

Functions of the disclosed systems, methods, and modules may be performed by computing device 1300 in response to processor(s) 1304 executing one or more programs of software instructions contained in main memory 1306. Such software instructions may be read into main memory 1306 from another storage medium, such as storage device(s) 1310. Execution of the software instructions contained in main memory 1306 cause processor(s) 1304 to perform the functions of the example embodiment(s).

While functions and operations of the example embodiment(s) may be implemented entirely with software instructions, hard-wired or programmable circuitry of computing device 1300 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more software instructions to processor(s) 1304 for execution. For example, the software instructions may initially be carried on a magnetic disk or solid-state drive of a remote computer. The remote computer can load the software instructions into its dynamic memory and send the software instructions over a telephone line using a modem. A modem local to computing device 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor(s) 1304 retrieves and executes the software instructions. The software instructions received by main memory 1306 may optionally be stored on storage device(s) 1310 either before or after execution by processor(s) 1304.

Computing device 1300 also may include one or more communication interface(s) 1318 coupled to bus 1302. A communication interface 1318 provides a two-way data communication coupling to a wired or wireless network link 1320 that is connected to a local network 1322 (e.g., Ethernet network, Wireless Local Area Network, cellular phone network, Bluetooth wireless network, or the like). Communication interface 1318 sends and receives electrical, electromagnetic, or optical signals that carry digital data streams representing various types of information. For example, communication interface 1318 may be a wired network interface card, a wireless network interface card with an integrated radio antenna, or a modem (e.g., ISDN, DSL, or cable modem).

Network link(s) 1320 typically provide data communication through one or more networks to other data devices. For example, a network link 1320 may provide a connection through a local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network(s) 1322 and Internet 1328 use electrical, electromagnetic or optical signals that carry digital data streams. The signals through the various networks and the signals on network link(s) 1320 and through communication interface(s) 1318, which carry the digital data to and from computing device 1300, are example forms of transmission media.

Computing device 1300 can send messages and receive data, including program code, through the network(s), network link(s) 1320 and communication interface(s) 1318. In the Internet example, a server 1330 might transmit a requested code for an application program through Internet 1328, ISP 1326, local network(s) 1322 and communication interface(s) 1318. The received code may be executed by processor 1304 as it is received, and/or stored in storage device 1310, or other non-volatile storage for later execution.

Basic Software System

Figure 14:
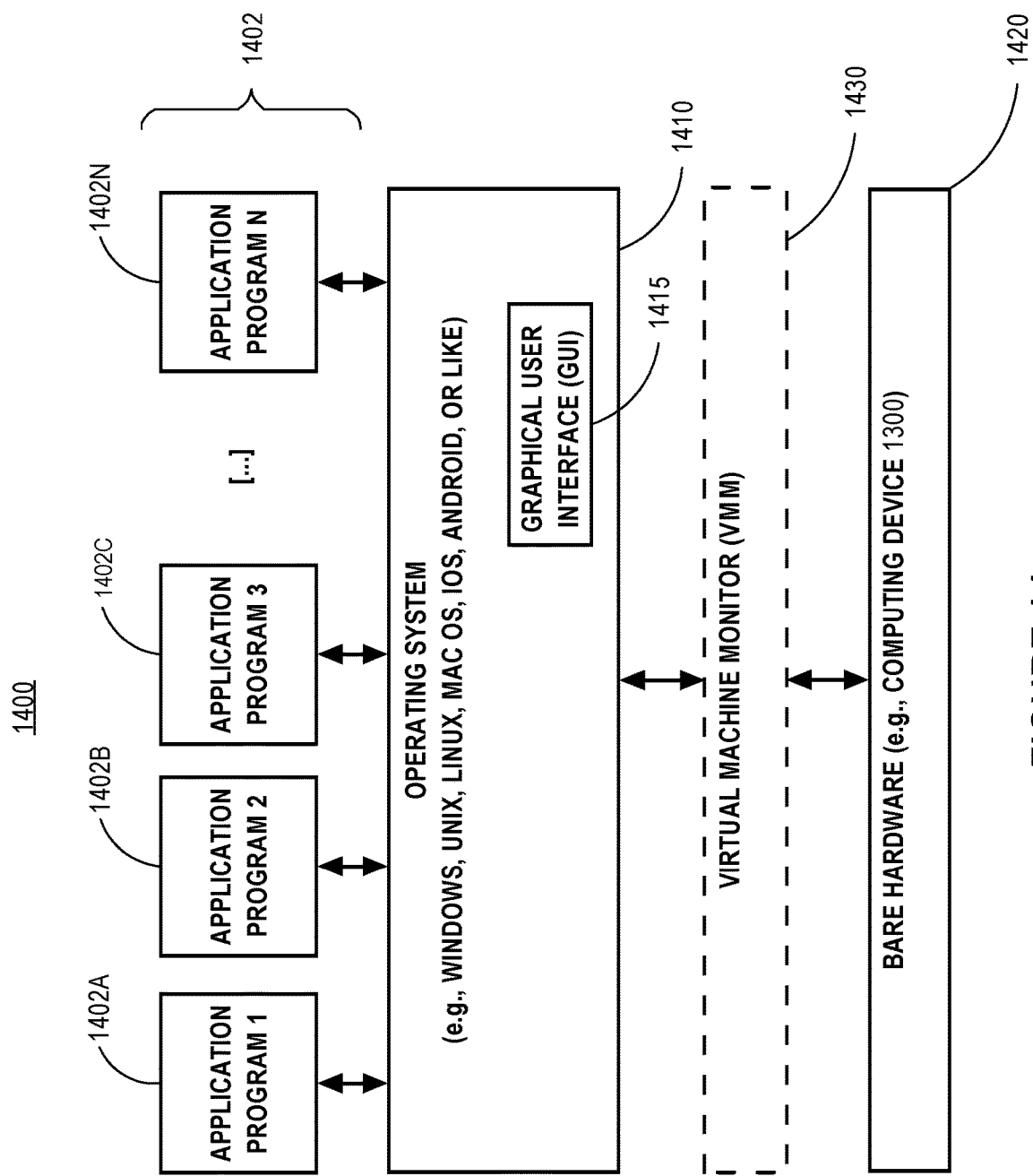
FIG. 14 is a block diagram of a basic software system for controlling the operation of the computing device.

FIG. 14 is a block diagram of a basic software system 1400 that may be employed for controlling the operation of computing device 1300. Software system 1400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1400 is provided for directing the operation of computing device 1300. Software system 1400, which may be stored in system memory (RAM) 1306 and on fixed storage (e.g., hard disk or flash memory) 1310, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 1310 into memory 1306) for execution by the system 1400. The applications or other software intended for use on device 1400 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of device 1300. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the device 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of device 1300 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present Application have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
at one or more computing devices comprising one or more processors and memory storing one or more computer programs executed by the one or more processors to perform the method, performing the operations of:
storing a plurality of datasets with metadata, wherein the plurality of datasets includes a plurality of fields, wherein the metadata includes a plurality of categories in which each category corresponds to one or more fields of the plurality of fields;
generating a hierarchy mapping that indicates a hierarchical relationship between different categories of the plurality of categories;
receiving a natural language query that specifies a first granularity level indicating a particular category of the plurality of categories, and one or more field values that correspond to the particular category;
identifying, based on the hierarchy mapping, one or more categories of the plurality of categories that are hierarchically related to the particular category and indicate one or more granularity levels that are hierarchically related to the first granularity level;
selecting, based on the metadata, two or more datasets of the plurality of datasets that include at least one category of the one or more categories;
translating at least one dataset of the two or more datasets to the first granularity level;
joining the two or more datasets to generate a composite dataset that includes the particular category;
executing the natural language query against the composite dataset to return a result for the natural language query.

2. The method of claim 1, further comprising, prior to translating the at least one dataset of the two or more datasets to the first granularity level:
generating one or more dataset filters based on the first granularity level;
translating the one or more dataset filters to a second granularity level corresponding to the at least one category;
after translating the one or more dataset filters, applying the one or more dataset filters to the at least one dataset of the two or more datasets.

3. The method of claim 1, wherein the metadata includes one or more measures, each measure of the one or more measures depending on at least one field of the plurality of fields.

4. The method of claim 1, wherein the natural language query specifies a particular measure.

5. The method of claim 1, wherein the natural language query is constructed based on one or more inputs received at a user interface comprising a plurality of predetermined query parameters that are selectable.

6. The method of claim 1, wherein the natural language query is constructed based on text input that is autocompleted.

7. The method of claim 1, wherein based on the metadata, selecting two or more datasets of the plurality of datasets that include at least one category of the one or more categories comprises ranking at least some of the plurality of datasets based on the hierarchical relationship between the particular category and the at least one category.

8. The method of claim 1, wherein based on the metadata, selecting two or more datasets of the plurality of datasets that include at least one category of the one or more categories comprises:
ranking at least some of the plurality of datasets based on a number of the one or more categories that are included in a particular dataset of the at least some of the plurality of datasets.

9. The method of claim 1, wherein the plurality of datasets includes a particular composite dataset that is generated based on all available data related to the particular category.

10. The method of claim 1, wherein the result is returned based on displaying the result as a line graph or a histogram.

11. A system, comprising:
storage media;
one or more processors;
and one or more programs stored in the storage media and configured for execution by the one or more processors, the one or more programs comprising instructions for:
storing a plurality of datasets with metadata, wherein the plurality of datasets includes a plurality of fields, wherein the metadata includes a plurality of categories in which each category corresponds to one or more fields of the plurality of fields;
generating a hierarchy mapping that indicates a hierarchical relationship between different categories of the plurality of categories;

receiving a natural language query that specifies a first granularity level indicating a particular category of the plurality of categories, and one or more field values that correspond to the particular category;

identifying, based on the hierarchy mapping, one or more categories of the plurality of categories that are hierarchically related to the particular category and indicate one or more granularity levels that are hierarchically related to the first granularity level;

selecting, based on the metadata, two or more datasets of the plurality of datasets that include at least one category of the one or more categories;

translating at least one dataset of the two or more datasets to the first granularity level;

joining the two or more datasets to generate a composite dataset that includes the particular category;

executing the natural language query against the composite dataset to return a result for the natural language query.

12. The system of claim 11, wherein the instructions further comprise, prior to translating the at least one dataset of the two or more datasets to the first granularity level:

generating one or more dataset filters based on the first granularity level;

translating the one or more dataset filters to a second granularity level corresponding to the at least one category;

after translating the one or more dataset filters, applying the one or more dataset filters to the at least one dataset of the two or more datasets.

13. The system of claim 11, wherein the metadata includes one or more measures, each measure of the one or more measures depending on at least one field of the plurality of fields.

14. The system of claim 11, wherein the natural language query specifies a particular measure.

15. The system of claim 11, wherein the natural language query is constructed based on one or more inputs received at a user interface comprising a plurality of predetermined query parameters that are selectable.

16. The system of claim 11, wherein the natural language query is constructed based on text input that is autocompleted.

17. The system of claim 11, wherein based on the metadata, selecting two or more datasets of the plurality of datasets that include at least one category of the one or more categories comprises ranking at least some of the plurality of datasets based on the hierarchical relationship between the particular category and the at least one category.

18. The system of claim 11, wherein based on the metadata, selecting two or more datasets of the plurality of datasets that include at least one category of the one or more categories comprises ranking at least some of the plurality of datasets based on a number of the one or more categories that are included in a particular dataset of the at least some of the plurality of datasets.

19. The system of claim 11, wherein the plurality of datasets includes a particular composite dataset that is generated based on all available data related to the particular category.

20. The system of claim 11, wherein the result is returned based on displaying the result as a line graph or a histogram.

\* \* \* \* \*